United States Patent
Brown et al.

(10) Patent No.: US 6,651,716 B1
(45) Date of Patent: Nov. 25, 2003

(54) METHOD AND TIRE ADAPTED FOR POST CURE TIRE UNIFORMITY CORRECTION

(75) Inventors: Robert Walter Brown, Medina, OH (US); Paul Harry Sandstrom, Tallmadge, OH (US)

(73) Assignee: The Goodyear Tire & Rubber Company, Akron, OH (US)

(*) Notice: Subject to any disclaimer, the term of this patent is extended or adjusted under 35 U.S.C. 154(b) by 0 days.

(21) Appl. No.: 09/511,546

(22) Filed: Feb. 23, 2000

(51) Int. Cl.[7] .................................................. B60C 1/00
(52) U.S. Cl. ........................................................ 152/564
(58) Field of Search ................................. 152/527, 526, 152/154.1, 454, 564, 537; 156/110.1, 123, 133, 135; 264/501, 502, 326, 328; 73/146

(56) References Cited

U.S. PATENT DOCUMENTS

| | | | |
|---|---|---|---|
| 2,963,737 A | | 12/1960 | Soderquist |
| 3,016,320 A | * | 1/1962 | Beckadolph ................ 156/123 |
| 3,039,839 A | | 6/1962 | Waters et al. |
| 3,389,193 A | | 6/1968 | Hughes |
| 3,464,264 A | | 9/1969 | French |
| 3,529,048 A | | 9/1970 | Kovac et al. |
| 3,529,148 A | | 9/1970 | Stefano et al. |
| 3,537,500 A | * | 11/1970 | Beneze ........................ 152/169 |
| 3,632,701 A | | 1/1972 | Devitt et al. |
| 3,635,610 A | | 1/1972 | Hall et al. |
| 3,725,163 A | | 4/1973 | Hofelt, Jr. |
| 3,739,533 A | | 6/1973 | Iida et al. |
| 3,838,142 A | | 9/1974 | Hochstein |
| 3,848,368 A | | 11/1974 | Toshioka et al. |
| 3,865,527 A | | 2/1975 | McGhee et al. |
| 3,872,208 A | | 3/1975 | Brown et al. |
| 3,880,556 A | | 4/1975 | Brown et al. |
| 3,916,969 A | * | 11/1975 | Auerbach et al. ........... 156/123 |
| 3,945,277 A | | 3/1976 | McGehee et al. |
| 3,946,527 A | | 3/1976 | Beer |
| 3,948,004 A | | 4/1976 | Gruber |
| 4,089,718 A | * | 5/1978 | Triolo et al. ................. 156/113 |
| 4,095,374 A | | 6/1978 | Ugo |
| 4,171,641 A | | 10/1979 | Landsness |
| 4,173,850 A | | 11/1979 | Gormish et al. |
| 4,420,453 A | | 12/1983 | Ayers |
| 4,458,451 A | | 7/1984 | Rogers et al. |
| 4,458,526 A | | 7/1984 | Doi et al. |
| 4,536,054 A | | 8/1985 | Wallner et al. |
| 4,654,253 A | | 3/1987 | Brown et al. |
| 4,711,285 A | * | 12/1987 | Ogawa et al. ............... 152/527 |
| 4,736,546 A | | 4/1988 | Ugo |
| 4,763,468 A | | 8/1988 | Brown et al. |
| 4,790,365 A | | 12/1988 | Sandstrom et al. |

(List continued on next page.)

FOREIGN PATENT DOCUMENTS

| | | |
|---|---|---|
| EP | 0522468 | 1/1993 |
| EP | 0888872 | 1/1999 |
| WO | WO98/05937 | 2/1998 |
| WO | WO00/11445 | 3/2000 |

*Primary Examiner*—S. Joseph Morano
*Assistant Examiner*—Long Bao Nguyen
(74) *Attorney, Agent, or Firm*—Howard M. Cohn

(57) ABSTRACT

The present invention relates to a tire construction and method of correcting one or more tire uniformity characteristics. A tire has two beads and a carcass reinforcement ply having reinforcement cords. The method is characterized by the steps of A) forming a portion of the tire with a material (typically a thermoplastic), that can be rendered plastic (such as by heating) and rendered non-plastic (such as by cooling), which, in turn, respectively, permits and restricts reorientation of the reinforcement cords; B) rendering the material plastic, after the tire has been vulcanized, to permit one or more of the reinforcement cords to be reoriented; C) reorienting one or more reinforcement cords with respect to other rein-forcement cords or tire components; and D) rendering the material non-plastic, to restrict further reorientation of adjacent reinforcement cords. Reorientation of the cords can be achieved without stretching them beyond their elastic limit.

11 Claims, 7 Drawing Sheets

U.S. PATENT DOCUMENTS

| | | |
|---|---|---|
| 5,022,186 A | 6/1991 | Rogers, Jr. |
| 5,058,647 A | 10/1991 | Gartland et al. |
| 5,060,510 A | 10/1991 | Rousseau |
| 5,103,669 A | 4/1992 | Kato |
| 5,114,516 A * | 5/1992 | Pilling et al. ............... 156/133 |
| 5,309,971 A * | 5/1994 | Baker et al. ................. 152/541 |
| 5,365,781 A | 11/1994 | Rhyne |
| 5,407,521 A | 4/1995 | Falvard |
| 5,458,176 A | 10/1995 | Rhyne |
| 5,616,859 A | 4/1997 | Cheng |
| 5,639,962 A | 6/1997 | Maloney |
| 5,756,589 A | 5/1998 | Sandstrom et al. |
| 5,871,601 A * | 2/1999 | Tsuda ......................... 152/527 |
| 5,901,863 A | 5/1999 | Riga et al. |
| 5,902,425 A * | 5/1999 | Armellin .................... 152/454 |
| 5,975,175 A * | 11/1999 | Armellin .................... 152/454 |
| 5,988,246 A * | 11/1999 | Villani et al. ............... 152/527 |
| 6,082,423 A * | 7/2000 | Roesgen et al. ............ 152/454 |
| 6,136,123 A * | 10/2000 | Kaido et al. ................ 152/510 |
| 6,253,816 B1 * | 7/2001 | Ide .............................. 152/527 |
| 6,260,596 B1 * | 7/2001 | Ubukata et al. ............ 152/527 |
| 6,261,399 B1 * | 7/2001 | Roesgen et al. ............ 152/510 |
| 6,273,160 B1 * | 8/2001 | Helfer et al. ............... 152/527 |
| 6,283,187 B1 * | 9/2001 | Villani et al. ............... 152/527 |

* cited by examiner

METHOD AND TIRE ADAPTED FOR POST CURE TIRE UNIFORMITY CORRECTION

CROSS-REFERENCE TO RELATED APPLICATIONS

Attention is directed to commonly-owned, PCT/US99/24283 and PCT/US99/24449, both filed Oct. 18, 1999.

This application also relates to copending application Ser. No. 09/510,859 entitled TIRE AND METHOD FOR CORRECTING TIRE UNIFORMITY THEREOF, filed concurrently herewith.

TECHNICAL FIELD OF THE INVENTION

The invention relates to correcting uniformity characteristics of a cured pneumatic tire.

BACKGROUND OF THE INVENTION

Pneumatic TIRES

FIGS. 1A and 1B illustrate an exemplary pneumatic tire 100 of the prior art. The tire 100 includes a pair of annular, substantially inextensible beads 102 and 104, each of which is disposed within a respective bead portion 106 and 108 of the tire 100, a generally cylindrical tread portion 110, a relatively inextensible belt structure ("belts") 112 disposed within the tread portion 110, and sidewall portions 114 and 116 extending between opposite sides 110a and 110b of the tread portion 110 and respective ones of the bead portions 106 and 108. The tire 100 has a section height SH measured from an edge of the bead portion 106 (or a nominal rim diameter) to an outer diameter of the tread portion 110. The tire 100 has an inner surface 118 and an outer surface 119. An inner liner (not shown) is typically disposed on the inner surface 118 of the tire 100.

At least one carcass reinforcing member 120 (also referred to as a "ply") extends between the two beads 102 and 104, within the carcass of the tire 100. The ply 120 has a central (middle) portion 120a which is disposed between the two beads 102 and 104, and has two opposite end portions ("turn-up" ends) 120b and 120c, each of which wrap around a respective one of the beads 102 and 104 and extend radially back toward the tread portion 110 of the tire 100. The tire 100 further typically includes bead filler apexes 122 and 124 disposed atop respective ones of the beads 102 and 104 and extending radially outwardly therefrom.

The tire 100 has an axis of rotation (not shown), an outer diameter which is twice (2×) a radius dimension between the axis of rotation and the tread surface, and an inner diameter which is (2×) the radius dimension between the axis of rotation and an inner edge of the bead portion. An equatorial plane "EP" for the tire 100, is defined as a plane which is perpendicular to the tire's axis of rotation and passing through the center of the tread portion 110, or midway between the tire's beads 102 and 104. A radial direction (orientation) is indicated by the arrow 130, and a lateral (or axial) direction (orientation) is indicated by arrows 132.

The at least one ply 120 of the tire is at least one layer of rubber-coated ply cords. Ply cords are typically formed of cotton, rayon, nylon, polyester or other man-made synthetic or textile cord which are capable of exhibiting permanent changes in physical properties upon application of load or heat, or of fiber glass, metal wire or the like, the physical properties of which are relatively non-changeable upon application of load or heat. Commonly-owned U.S. Pat. No. 4,654,253 (Brown, et al.; 1987) and U.S. Pat. No. 4,763,468 (Brown, et al.; 1988) disclose high strength greige woven fabrics particularly suitable for use as a tire reinforcement component, wherein a cord may comprise at least two optimally drawn polymeric yarns.

Generally, there are three basic types of pneumatic tires— "bias", "bias/belted" and "radial"—each type essentially being defined by the orientation of the cords within the at least one ply (120).

In the bias (or "cross-ply") tire, the cords of the reinforcing ply extend diagonally across the tire from bead-to-bead, typically at an angle of between 25 and 40 degrees with respect to a centerline of the tire. The cords run in opposite directions in each successive reinforcing ply layer, resulting in a crisscross pattern of cords.

In the bias/belted tire, as in the bias tire, the cords extend diagonally across the tire, from bead-to-bead, typically at an angle of between 25 and 45 degrees with respect to the centerline of the tire, and the cords run in opposite directions in each successive ply. A cord-reinforced "belt" structure is disposed in the tread portion of the tire, and the belt cords typically have an angle of between 20 and 35 degrees with respect to the equatorial plane of the tire.

In the radial tire, the plies of reinforcing cords are parallel and extend transversely from bead-to-bead. That is, the parallel cords are substantially perpendicular to the direction of tire travel.

A cord-reinforced belt structure is disposed in the tread portion of the tire, and is composed of several layers of cords disposed nearly parallel (10 to 30 degrees) to the circumference of the tire. The belt structure acts to restrict the reinforcing plies. Increased sidewall bulging is characteristic of radial tires.

TIRE MANUFACTURING PROCESS

As is disclosed in commonly-owned European Patent Application Publication No. 0 522 468 A1 (published 13.02.93), in a typical tire manufacturing process, an inner liner is disposed on a generally cylindrical tire building drum (or mandrel). At least one carcass reinforcing member ("ply", compare 120) is disposed over the inner liner. Next, bead rings (compare 102, 104) are disposed over the reinforcing ply, and apex rubber (compare 122, 124) is applied over the beads. Next, a turn-up bladder or the like, such as is disclosed in U.S. Pat. No. 5,407,521 (Falvard; 1995), is activated to turn-up the two opposite end portions (compare 120b, 120c) of the ply (and, optionally, the inner liner) around the bead rings. Next, sidewall rubber is added, and the resulting tire "carcass" is shaped into what is generally its ultimate toroidal form. Tread rubber and, optionally, belts or breakers and chafers, may then be added to the construction, and the resulting "green" tire can be inserted into a mold wherein it is heated for a period of time (e.g., approximately 10–30 minutes) at an elevated temperature (e.g., at least approximately 120 degrees Celsius, such as approximately 150 degrees Celsius) to "cure" or "vulcanize" the rubber components of the green tire. During the molding process, tread patterns are typically impressed into the tread rubber, and designs, lettering and the like may be formed in the sidewall rubber of the tire. In some cases, tires are retained in the mold until they have become substantially cooled down. More often, tires are removed from the mold without a cooling period, and are allowed to cool down (e.g., to ambient temperature) outside of the mold. Rubber is a poor conductor of heat and the thick tread portion of the tires continue to vulcanize for a period after removal from the molds.

UNIFORMITY CHARACTERISTICS

After a tire is assembled and at least partially cured, the tire is typically tested for one or more uniformity characteristics. "Uniformity" is defined herein as what a "perfect" or "ideal" tire would yield for a certain measured characteristic when tested during rotation. "Uniformity characteristic" is defined herein as a deviation in those certain characteristics from what the perfect tire would yield during testing.

As is evident, the pneumatic tire is a somewhat complicated construction of various materials which is difficult to manufacture with perfect consistency, from tire-to-tire inconsistencies in materials, in the placement of the materials on the building drum, and other process variables will contribute to both dimensional and dynamic variations, from tire-to-tire.

Generally, a dimensional non-uniformity is a deviation from perfect roundness of the outer circumference of the tire (alternatively, the outer circumference of the tire being round, but off-center with respect to the tire's axis of rotation), and a dynamic non-uniformity is a condition which manifests itself in the tire's ability to react forces at different orientations of the tire.

Sources of such tire non-uniformities may include one or more of the following:

a. The tread, sidewall and innerliner are stored on long rolls in the "green" state and are assembled into a tire in the green state. While in the green state, during storage and tire building, rubber can deform. Therefore, the green rubber tire components may not remain uniformly thick before curing.

b. The beads may deform non-uniformly, since they incorporate a green rubber matrix and are held in position by a deformable green rubber matrix.

c. Before curing, the position of the ply within the tire is fixedly held by the surrounding green rubber. If the green rubber deforms, the ply's position may be displaced.

d. Where the ply is spliced (overlapped on the build drum), it is doubled over itself, and stiffer than the remainder of the ply.

e. The ply cords may not be laid onto the building drum with uniform straightness and tension, and the two beads may not be positioned perfectly parallel (relative to each other) over the ply on the building drum.

f. In the mold, cord shrinkage and carcass inflation may cause the cords to slip around the beads, but spliced portion(s) of the ply may tend to slip less than unspliced portion(s).

g. If the belt and tread are not positioned symmetrically over the green carcass, the green tire, and hence the cured tire, will not be uniform. The nominally cylindrical belt package may also be somewhat conical.

h. If the green tire is not positioned symmetrically within the mold, the cured tire will not be uniform.

i. In the mold, the inflated bladder tensions (stretches) the ply outward, and the ply's nylon or polyester fibers shrink when heated, thus tensioning the ply further. Under tension, the ply slips around the bead, possibly to a different extent at different locations around the bead, and a splice slips around the bead least.

j. In the mold, the rubber can "lock up" (stiffen curing) around the ply at different times at different locations, thus causing nonuniform ply stress.

TIRE UNIFORMITY MEASUREMENT

The degree of dimensional and/or dynamic uniformity in a tire may manifest itself in the tire's ability to run smoothly and vibration free, as well as in the "handling" of the tire. Therefore, after a tire is manufactured, and before it is sold, it is typically tested for tire uniformity characteristics. A variety of tire uniformity measuring (testing) machines (apparatuses) are known and are described, for example, in U.S. Pat. No. 4,171,641, U.S. Pat. No. 4,458,526, U.S. Pat. No. 5,022,186 and U.S. Pat. No. 5,103,669.

A typical tire uniformity testing process, and representative results obtaining therefrom, are presented in U.S. Pat. No. 5,365,781 (Rhyne; 1994; hereinafter referred to as the '781 Patent). (See also related U.S. Pat. No. 5,616,859 and U.S. Pat. No. 5,458,176).

As described in the '781 Patent, an initial force variation of an uncorrected tire, as tested, may be graphically illustrated to represent corresponding electrical signals from a tire uniformity tester. The force variation as a function of circumferential position on the tire, as represented by a waveform, may be decomposed into a series of desired harmonic waveforms. The harmonic waveforms are determined in a computer by a Fourier analysis of the radial force variation waveform sensed during rotation of the tire on the tire uniformity tester. The analysis and waveforms are stored in the computer and referenced to a particular tire. U.S. Pat. No. 3,739,533 also describes known techniques for measuring lateral and/or radial force variations in a pneumatic tire.

FIG. 2A is a graph illustrating a "composite" waveform (force variation curve) 202 such as may be generated by a tire uniformity tester (not shown), for a particular tire (not shown) being tested. The horizontal axis represents the circumferential position (from 0 to 360 degrees) on the tire being tested. The vertical axis represents the amplitude of a measured radial force variation, in any suitable units such as decaNewtons (daN). The composite waveform 202 is representative of the "raw" data from the tire uniformity tester and, as is evident, there is a variation in radial force as a relatively complex function of circumferential position on the tire. The composite waveform 202 can, in a computer (not shown) be decomposed into a series of any desired number of "harmonic" waveforms by employing a Fourier analysis of the composite waveform.

FIG. 2B is a graph similar to the graph of FIG. 2A, and illustrates a first (1st), a second (2nd) and a third (3rd) harmonic of the composite waveform 202 of FIG. 2A. The first harmonic waveform comprises a single sine wave (between 0 and 360 degrees), the second harmonic waveform comprises two sine waves (between 0 and 360 degrees), the third harmonic waveform comprises three sine waves (between 0 and 360 degrees) and, generally, the "Nth" harmonic" comprises N sine waves between 0 and 360 degrees. Together, these constituent harmonic waves, weighted by their respective amplitudes, substantially constitute the original composite measured waveform when added together.

Returning to FIG. 2A, a low amplitude on the composite waveform 202 represents a "soft spot" on the tire. Two such soft spots 210 and 212 are identified on the waveform 202. Similarly, a high amplitude on the composite waveform 202 represents a "hard spot" on the tire. One such hard spot 214 is identified on the waveform 202. A peak-to-peak magnitude between the soft spots and the hard spot(s) is indicative of a uniformity characteristic of the tire, and may be used as an input parameter for tire uniformity correction, which is discussed in greater detail hereinbelow. For example, as shown in FIG. 2A, there is approximately a 7 daN peak-to-peak variation between the soft spot 210 and the hard spot 214. Similar high and low amplitude force measurements are evident on the harmonic waves illustrated in FIG. 2B, are similarly indicative of tire uniformity characteristics, and may also be used as input parameters for tire uniformity correction.

Generally, if the uniformity characteristic of the tire has a magnitude which is less than a predetermined relatively low minimum threshold magnitude, which is deemed not to be detrimental to a vehicle ride or produce undesirable vibrations in the vehicle, the tire may be shipped to a customer. If the uniformity characteristic magnitude is greater than a predetermined relatively high maximum threshold magnitude, the tire may be scrapped. If the uniformity characteristic magnitude is between the relatively low minimum threshold magnitude and the relatively high maximum threshold magnitude, the tire may be suitable for correction.

Various analytical methods may be employed to determine whether the tire needs to be (and can be) "corrected"—in other words, its uniformity improved—based on determinations of:

a. the peak-to-peak value of the harmonic waveform or of the composite waveform (as discussed hereinabove with respect to FIGS. 2A and 2B);

b. the first and second derivatives of radial and lateral waveforms (force variation curves), as compared with predetermined specifications (thresholds) (see, e.g., U.S. Pat. No. 5,639,962); or c. the mean or root-mean-square of a low-band filtered variation function (see, e.g., U.S. Pat. No. 4,702,103).

TIRE UNIFORMITY CORRECTION

Techniques for correcting tire uniformity can be grouped into two general categories—"grinding", and "without grinding".

Grinding techniques typically involve grinding of tread rubber about the outer circumference of the tire at a selected location and up to 180 degrees about the outer circumference of the tire. Grinding of the tire can contaminate a tire plant environment, reduce the useful tread life of the tire or may render the tire visually unappealing. Examples of grinding techniques and methodologies may be found in U.S. Pat. No. 3,739,533, U.S. Pat. No. 3,848,368, U.S. Pat. No. 3,946,527, U.S. Pat. No. 4,736,546, U.S. Pat. No. 4,173,850, U.S. Pat. No. 4,536,054, U.S. Pat. No. 4,458,451, U.S. Pat. No. 4,458,451, U.S. Pat. No. 4,095,374, U.S. Pat. No. 5,022,186, U.S. Pat. No. 3,848,368, U.S. Pat. No. 3,880,556, U.S. Pat. No. 3,948,004, and WO 98/05937.

A number of techniques for correcting (e.g., improving, altering) tire uniformity without grinding are known, as follows.

U.S. Pat. No. 2,963,737 (Soderquist; 1960) discloses a machine for tire manufacture (post inflation). A method is described for preventing ply shrinkage and consequent tire distortion and cracked tread rubber in tires with nylon and synthetic plies. After vulcanizing at 315–350 degrees Fahrenheit, the tire is rimmed up at its beads (not supported by its tread to avoid distortion) and post-inflated at 50–60 psi while rotating (to avoid uneven cooling) at 10–20 rpm and being sprayed until it cools to 200 degrees Fahrenheit.

U.S. Pat. No. 3,039,839 (Waters, et al.; 1962) discloses a method of making tires, and addresses issues of tire shrinkage and distortion caused by shrinkage of nylon ply cords when removed from a mold without first being allowed to cool. As mentioned therein, when nylon cord tires are removed hot from the mold, the nylon cord in the tire plies tends to shrink and distort the tire from its molded shape. It is disclosed in this patent to narrow the bead set (bead spacing when on a tire building drum) to stretch the cords during molding. Then, upon removal of the hot tire from the mold, the tire is promptly mounted on an inflating rim, and retained inflated until it cools to below the nylon cord's shrinkage temperature of about 200 degrees Fahrenheit. This overcomes the objectionable shrinkage of cords in the tires, and an objectionable tire growth when the tires are run in service.

U.S. Pat. No. 3,389,193 (Hughes; 1968) discloses method and apparatus for shaping a deformed tire. The tire is heated in an oven to about 135 degrees Fahrenheit, and is then passed to a "tire shaping machine" where the uninflated tire is supported vertically on its tread by circumferentially spaced rollers (from below). Four idler pressure rollers (from above) apply pressure in a direction to cause the tread to buckle inwardly while rotating.

U.S. Pat. No. 3,464,264 (French; 1969) discloses a pneumatic tire run-in machine for removing temporary casing distortions, including flat spots. The tire is inflated, suspended and rotated within a plurality of rollers arranged around a circle with at least one of the rollers driving the tire. The small diameter of the rollers increases tire distortion and generates a large amount of heat, without requiring an external heating apparatus.

U.S. Pat. No. 3,529,048 (Kovac, et al.; 1968) discloses a method for processing of pneumatic tires wherein a tire is conditioned after being removed from the vulcanizing mold and before cooling to ambient temperature by applying a load, such as a radial load, to the tire tread while the tire is inflated and at the same time relatively moving the load along the tire, such as by rotating the tire, to cause deflection (alternate stressing and relieving of tire cords) along successive circumferential increments, all around the circumference of the tire. The conditioning steps are begun as quickly as possible, not more than within a few minutes, after the tire is removed from the mold, and the tire is conditioned for a time period of from one to two times the duration of the vulcanizing mold cycle, and the inflation pressure of the tire during conditioning is preferably of the general order of the service pressure of the tire. The exterior load on the tire being conditioned may be a radially inwardly directed radial load applied to the outside circumference of the tire. Alternatively, the exterior load may be a lateral load against the sidewall of the tire. Alternatively, the exterior load may be an oblique load (having radial and lateral force components) against the tire tread, shoulder or sidewall. The conditioning steps help obtain a more uniform tension in the tire cords while the curing or vulcanizing process continues while the hot tire is being cooled after removal from the mold. As noted in the patent, it is believed that the tire conditioning process may have one or more of the following actions on the hot tire for improving the uniformity of the tire.

"First, the aforementioned tire cords [cotton, rayon, nylon, polyester, or other man-made synthetic or textile cord] capable of exhibiting permanent changes in physical properties upon application of load and heat are alternatively stretched by the load and relaxed while hot to make generally uniform the stress in the fibers thereof . . . . Second, any of the separate plies or belt of the tire cords in the tire may move relative either to the other plies or belt or to the surrounding rubber to make uniform the stresses therebetween. Third, different portions of any kind of tire cord in any belt or ply may move relative to each other or to portions of surrounding rubber to make generally uniform the stresses in the cord in the tire even though the cord does not permanently change its physical characteristics." (column 2, line 72 through column 3, line 18)

U.S. Pat. No. 3,632,701 (Devitt, et al.; 1972) discloses conditioning of tires to improve uniformity. Excessive radial force variations in a tire can be reduced by heating all or part of a tire while supported vertically and positioned so that the area of maximum force is located in the top quadrant of the tire. A suitable source such as a pot heater, rubber kiln or infrared heat may be used for heating. An elevated temperature (e.g., 150–280 degrees Fahrenheit) is maintained for a period of time (e.g., 60 minutes) while the tire is inflated to a pressure of 0–50 psi. The technique is applicable to nearly all types of tires including radial, belted bias, and bias tires containing rayon, nylon or polyester cords.

U.S. Pat. No. 3,635,610 (Hall, et al.; 1972) discloses a tire conditioning apparatus for removing flat spots and other surface irregularities from tires preliminary to recapping or truing them. Stress-producing conditions, including varying rates of cure applied after initial curing in the mold, the weight of a vehicle at rest, and the weight of tires pressing against other tires in a stack of tires, may cause flat spots and surface irregularities in the tires. An uninflated tire is rotated, heated, and pressed by a pressure roll assembly which has for its function flexing the tire and kneading it to work out the flat spots and surface irregularities in the tire.

U.S. Pat. No. 3,725,163 (Hofelt, Jr.; 1973) discloses a method of improving performance characteristics of pneumatic tires. Radial and lateral force variations are reduced by applying a small amount of material to portions of the tread area. This patent describes an exemplary apparatus for measuring these force variations and is exemplary of a number of patents involving the addition of material to a tire to improve a uniformity characteristic thereof.

U.S. Pat. No. 3,838,142 (Hochstein; 1974) discloses a procedure for correcting radial force variation in pneumatic tires using ionizing radiation of high energy electrons. A load drum is forced at normal operating load against the tread surface of an inflated rotating tire, and a force transducer measures the magnitude of force against the drum. The radiation source irradiates sections of the tread body and/or sidewalls which exert low force to increase their ply modulus of elasticity in those sections. The irradiation is done concurrently with the measuring.

U.S. Pat. No. 3,865,527 (McGhee, et al.; 1975) discloses tire conditioning and truing apparatus which "conditions" a tire to remove flat spots by heating its sidewalls while it is uninflated and rotating. See also related U.S. Pat. No. 3,945,277 (McGhee, et al.; 1976).

U.S. Pat. No. 3,872,208 (Brown, et al.; 1975) discloses corrective heating of pneumatic tires. Radial force variation of a cured tire are reduced by selectively heating the innerliner (from inside the tire) in an area adjacent to excessive radial force variation for a predetermined time or to reach a predetermined temperature (typically 225–240 degrees Fahrenheit). The tire mounted on a support flange (not a rim) by its bead, is uninflated, and is positioned vertically with the heated portion positioned upward. See also related U.S. Pat. No. 3,880,556 (Brown, et al.; 1975).

U.S. Pat. No. 4,420,453 (Doi, et. al.; 1984) discloses apparatus for measuring tire uniformity. A tire is removed from the mold, held uninflated until it cools to 149 degrees Celsius, and then post inflated until cooled to below 90 degrees Celsius, while being supported solely by its bead edges. This allows the cord modulus to increase dramatically before inflating, and reduces the tendency for sidewall waviness as compared with a tire which is post-inflated immediately after molding.

U.S. Pat. No. 5,060,510 (Rosseau; 1991) discloses a method of correcting variations in radial force between a tire and the ground. The correction is effected by means of wedges in the form of circular rings placed between the mounting rim and the beads of the tire. The thickness of the wedge, at various positions around the tire, is related to the measure of force variation.

U.S. Pat. No. 5,365,781 (Rhyne; 1994; '781 Patent) discloses tire uniformity correction without grinding. A tire is tested for uniformity and an electrical signal is generated, as described hereinabove. Then, tire uniformity is corrected by stretching at least a portion of at least one carcass reinforcing member beyond its elastic limit for a predetermined time, thereby permanently deforming the at least one, and preferably many, carcass reinforcing members, either by inflating the tire to a significantly raised pressure or by mechanical means. The stretching results in a permanent lengthening (elongation) of the carcass reinforcing member by a predetermined amount in the range of 0.1 to 2 or 3 percent and at a location which are a function of the measured uniformity characteristic. The techniques are generally applicable to correcting a uniformity characteristic in a cured tire. As noted in the '781 Patent, materials of the carcass reinforcing member(s) such as nylon and polyester are readily adaptable to correction by the present invention. Materials such as polyester, steel, Kevlar (tm) and rayon are not as easily permanently elongated and may require higher pressure or longer hold time. Selected ones of the techniques for uniformity correction set forth in the '781 Patent are discussed hereinbelow with respect to FIGS. 3, 3A, 4, 5 and 6.

FIGS. 3A and 3B (comparable to FIG. 8 and FIG. 9, respectively, of the '781 patent) illustrate a tire being corrected for uniformity, according to a technique such as is described in the '781 Patent.

The tire 300 (compare 100) includes a pair of annular, inextensible beads 302 and 304 (compare 102 and 104), each of which is disposed within a respective bead portion 306 and 308 (compare 106 and 108) of the tire 300, and includes a generally cylindrical tread portion 310 (compare 110), (optionally) a belt structure ("belts") 312 (compare 112) disposed within the tread portion 310, and sidewall portions 314 and 316 (compare 114 and 116) extending between opposite sides 310a and 310b (compare 110a and 110b) of the tread portion 310 and respective ones of the beads 302 and 304. The tire 300 has a section height SH, an equatorial plane EP and an axis of rotation A. An inner liner (not shown) is disposed on the inner surface 318 of the tire 300. The tire has an outer surface 319.

At least one carcass reinforcing member 320 (or "ply", compare 120) extends between the two beads 302 and 304, through the carcass of the tire. The carcass reinforcing member 320 has a central portion 320a (compare 120a) which is disposed between the two beads 302 and 304, and has two opposite end portions ("turn-up" ends) 320b and 320c (compare 120b and 120c), which wrap around a respective one of the beads 302 and 304 and extend radially back toward the tread portion 310 of the tire 300. The tire 300 may further include bead filler apexes (not shown, compare 122 and 124) disposed atop respective ones of the beads 302 and 304 and extending radially outwardly therefrom.

In a tire which has cooled down after being molded, the turn-up ends 320b and 320c are, for purposes of this discussion of a tire uniformity correction technique, essentially "attached" to a respective one of the beads 302 and 304 and, as will be described in greater detail hereinbelow, the central portion 320a of the carcass reinforcing member 320 is essentially "attached" to the belt structure 312.

Relevant portions of a tire uniformity correction machine (apparatus) are shown and described, as follows, as well as a technique for performing uniformity correction.

The tire 300 is mounted to a rim-like structure comprising two rim halves 322 and 324. The bead portions 306 and 308 engage the rim halves 322 and 324 in an airtight manner so that the tire 300 can be inflated.

Restraint rings 332 and 334 engage sidewalls 314 and 316, respectively, of a tire 300 with different axial displacements D1 and D2, respectively, to impart a different radius of curvature R1 and R2, respectively, to portions of the carcass reinforcing member 320 (best viewed in FIG. 3A) in each of the sidewalls, approximately halfway between a respective bead and the belt structure 312. As best viewed in FIG. 3B, the restraint ring 332 deflects the sidewall 314 of the tire 300 from an undeflected configuration (shown in dashed lines) axially inwardly (toward the opposite sidewall of the tire). The sidewall-contacting surfaces of the restraint rings 332 and 334 may be rounded to avoid sharp edges being in contact with the sidewalls 314 and 316, respectively, of the tire 300. Each restraint ring 332 and 334 has a radial length of engagement LE1 (best viewed in FIG. 3B) with the sidewall 314 of the tire 300 which is a relatively small percentage (i.e. less than 25%) of the section height SH of the tire 300. The restraint rings 332 and 334 may each preferably have a flat or planar surface 332a and 334a, respectively, urging against a respective sidewall 314 and 316 of the tire 300, for use in correction of a first harmonic or composite of radial force variation or in correction of conicity.

With the restraint rings 332 and 334 fixed in place and with the sidewalls 314 and 316 deflected, as shown, the tire 300 is inflated with a relatively high inflation pressure (INFLATION PRESSURE), such as 100 pounds per square inch (psi) or 7 bars. This will create a load in the carcass reinforcing member 320 thereby stretching beyond its elastic limit and permanently deforming the carcass reinforcing member 320 by an amount and at a location which are functions of the measured uniformity characteristic, resulting in a permanent lengthening (elongation) of the carcass reinforcing member to thereby correct (improve) the uniformity characteristic of the tire 300. A belt restraint ring 336 (omitted from the view of FIG. 3B) may be optionally provided in contact with the tread portion 310 to counteract the relatively high inflation pressures so that the belt structure 312 is not excessively expanded in the circumferential direction.

As best viewed in FIG. 3B, the carcass reinforcing member 320 has an upper end point 320d at which load in the carcass reinforcing member is transmitted to the belt structure 312 of the tire 300, and has a lower end point 320e in the area of the bead 302, at which load in the carcass reinforcing member 320 is transmitted to the bead 302 of the tire 300. The radius of curvature R2 in a maximally restrained portion of the tire 300 corresponding to displacement D2 is significantly less than radius of curvature R1 in the minimally restrained portion of the tire corresponding to displacement D1. Different radii of curvature provide different tension values in respective carcass reinforcing members (320).

As best viewed in FIG. 3A, with the restraint rings 332 and 334 in place and with the relatively high inflation pressure acting upon the sidewalls 314 and 316 of the tire 300, it is apparent that the original or unrestrained radius of curvature R1 of the carcass reinforcing member 320 has changed and becomes a relatively smaller radius of curvature R2. (The larger radius of curvature R1 occurs at locations of minimum restraint around the tire 300 with a planar surface restraint ring.) Physically, the smaller radius R2 of portion of the carcass reinforcing member, when the interior of the tire 300 is subjected to the relatively high inflation pressure, will not be permanently elongated the same amount as the unrestrained portion of the carcass reinforcing member 320 having the relatively larger radius of curvature R1. Generally, for a given inflation pressure, a larger radius of curvature of a portion of the carcass reinforcing member results in a relatively higher tension acting on that portion of the carcass reinforcing member. The higher tension in portions of the carcass reinforcing member 320 generally results in a relatively greater elongation above the elastic limit of the carcass reinforcing member 320 which results in its permanent elongation.

The '781 Patent discloses a number of variations on and applications for the technique and apparatus described hereinabove, some of which are described hereinbelow with respect to FIGS. 4, 5 and 6. For example, when the first harmonic radial force variation is caused by tire attributes other than radial runout, it may be necessary to introduce a radial runout to reduce the magnitude of the first harmonic radial force variation. For example, rather than having a flat planar surface 332a on the restraint ring (e.g., 332), the restraint ring may have a cupped segment extending, for example, over a 90 degree arc length of the restraint ring so as to provide nonlinear restraint to the sidewall of the tire.

FIG. 4 (comparable to FIG. 15 of the '781 Patent) illustrates a tire being corrected for uniformity, according to a technique such as is described in the '781 Patent. This technique is generally similar to the technique described with respect to FIGS. 3A and 3B. A tire 400 is essentially identical to the tire 300 in that it has a tread portion 410 (compare 310), a bead 402 (compare 302) in a bead portion 406 (compare 306), (optionally) a belt structure 412 (compare 312) in the tread portion 410, a sidewall 414 (compare 314), an inner surface 418, and an outer surface 419.

At least one carcass reinforcing member 420 (compare 320) extends between the two beads of the tire 400, only one 402 of which is visible in FIG. 4, through the carcass of the tire, and has a central portion 420a (compare 320a) and two opposite end portions ("turn-up" ends), one 420b of which is visible in FIG. 4, which wrap around a respective one of the beads 402 and extend radially back toward the tread portion 410 of the tire 400. For purposes of this discussion, the tire 400 is assumed to already have cooled down after being molded, in which case the carcass reinforcing member 420 has an upper end point 420d (compare 320d) at which load in the carcass reinforcing member is transmitted to the belt structure 412 of the tire 400, and has a lower end point 420e (compare 320e) in the area of the bead 402, at which load in the carcass reinforcing member 420 is transmitted to the bead 302 of the tire 400.

The tire 400 is mounted to a rim-like structure comprising two rim halves, a one 422 (compare 322) of which is visible in FIG. 4. A restraining ring 432 (compare 332) having a flat surface 432a (compare 332b) is urged against the sidewall 414 of the tire 400, and has a radial length of engagement LE2 (compare LE1) which is a relatively large (e.g., greater than 25%) percentage of the section height (SH) of the tire 400, resulting in a radius of curvature R3 which is less than the initial (unrestrained) radius of curvature R1. In a manner similar to the technique described hereinabove with respect to FIGS. 3A and 3B, an elevated air pressure (AIR PRESSURE) within the tire 400 provides the motive force for stretching the carcass reinforcing member 420 beyond its elastic limit, resulting in its permanent elongation.

FIG. 5 (comparable to FIG. 11 of the '781 Patent) illustrates a portion of a carcass reinforcing member 520 (compare 420) of a tire (not shown, compare 400) being corrected for uniformity. As in the previous examples, the carcass reinforcing member 520 (compare 420) has an upper end point 520d (compare 420d) which is essentially "attached" to the belt structure (not shown), and a lower end point 520e (compare 420e) which is essentially "attached" to one of the beads (not shown) of the tire.

In this example, a sidewall of the tire, hence the carcass reinforcing member 520, is restrained at two radially-separated locations, one location 542 being near the tire's belt (and adjacent the point 520d) the other location 544 being near the tire's bead (and adjacent the point 520e). This dual-location restraint is effectuated by a restraint device 530 comprising two portions 532 and 534 that contact the sidewall of the tire at the two radially separated locations 542 and 544, respectively.

The two portions 532 and 534 of the restraint device 530 are spaced apart from one another. Therefore, the sidewall of the tire has an unrestrained length "UL" which will be deflected by the inflation pressure (INFLATION PRESSURE) during correcting. The restraint device 530 allows the carcass reinforcing member 520 to have a deflection and a radius of curvature R4 which is smaller than the initial unrestrained radius of curvature R1 under the influence of the inflation pressure. The carcass reinforcing member 520 is shown as a dashed line 520' prior to inflation, and as a solid line after inflation.

The restraint device 530 may be sized so that the unrestrained length UL varies circumferentially around the tire. In this manner, the carcass reinforcing member(s) 520 may be permanently elongated during inflation a greater amount where the unrestrained length UL has a larger dimension.

FIG. 6 (comparable to FIG. 17 of the '781 Patent) illustrates a tire being corrected for uniformity, according to a technique such as is described in the '781 Patent. This technique differs from the techniques described hereinabove with respect to FIGS. 3, 3A, 4 and 5 in that the carcass reinforcing member 620 (compare 520) is stretched by mechanical means rather than by restraining the sidewall(s) of the tire and inflating the tire to a significantly raised pressure. Nevertheless, the stretching results in a comparable permanent lengthening (elongation) of the carcass reinforcing member 620.

The tire 600 is essentially identical to the tire 400 in that it has a tread portion 610 (compare 410), a bead 602 (compare 402) in a bead portion 606 (compare 406), (optionally) a belt structure 612 (compare 412) in the tread portion 610, a sidewall 614 (compare 414), an inner surface 618, and an outer surface 619.

At least one reinforcing (or "carcass") ply 620 (compare 420) extends between the two beads of the tire 600, only one 602 of which is visible in FIG. 6. For purposes of this discussion, the tire 600 is assumed to already have cooled down after being molded, and, as in the previous examples, the carcass reinforcing member 620 has an upper end point 620d (compare 420d) which is essentially "attached" to the belt structure 612, and a lower end point 620e (compare 420e) which is essentially "attached" to one 602 of the beads of the tire 600.

A mechanical means 630 for stretching and permanently elongating the carcass reinforcing member 620 comprises the following elements:

a. elements 632 and 634 (compare 422) which hold the bead portion 606 of the tire 600;

b. an element 636 which holds the tread portion 610 of the tire 600; and c. an element 638 which pushes axially outwardly on the sidewall 614 of the tire 600.

The tire 600 is shown with the element 638 stretching the sidewall 614 of the tire 600 axially outwardly to elongate and permanently deform the carcass reinforcing member, as discussed hereinabove. The pre-stretched carcass reinforcing member 620 is illustrated by the dashed line 620'. The force applied by the element 638 to the sidewall 614 of the tire 600, to deflect the sidewall 614 and stretch the carcass reinforcing member 620, is directed parallel to the axis of rotation of the tire at a position on the inside surface of the sidewall 614 which is approximately halfway between the bead 602 and the belt structure 612. Therefore, the force is substantially "normal" (e.g., at 90 degrees) to the surface of the sidewall (or radial with respect to the curvature of the sidewall, as distinguished from radial with respect to the tire's axis of rotation). It is disclosed in the '781 Patent (see, e.g. FIG. 19 and related discussion therein) that, in an alternate embodiment of stretching the carcass reinforcing member by a mechanism, mechanical stretching of the carcass reinforcing member beyond its elastic limit can be accomplished by radially (with respect to the tire's axis of rotation) stretching the carcass reinforcing member between its upper 620d and lower 620e attachment points, such as by moving the lower attachment point 620e radially inward and the attachment point 620d radially outward. It is also disclosed in the '781 Patent that stretching the carcass reinforcing members could be accomplished by a combination of mechanical stretching and by inflation pressure stretching.

There have thus been described a number of techniques for correcting tire uniformity. Generally, in all of the techniques describe hereinabove with respect to FIGS. 3A, 3B, 4, 5 and 6, tire uniformity correction may be achieved only by stretching a carcass reinforcing member (e.g., the cords of the ply) beyond its elastic limit, thereby permanently deforming and elongating the carcass reinforcing member. This may reduce the ply's strength, fatigue resistance, and adhesion to the rubber. Also, the forces required to permanently deform the carcass reinforcing members, whether applied by pressure or by mechanical devices, will exert tremendous stress on the beads. More generally, it should be appreciated that it is generally undesirable to stretch an elastic member to the point where it permanently deforms, since this may adversely affect the elastic member's subsequent ability to exert and/or react forces—in other words, to act in an elastic mode in a predicable manner. (Consider, for example, the case of a stretched out elastic waistband on a garment.) In a worst case, the elastic member may be stretched to the point that it breaks, rendering it essentially useless.

Another nuance of the stretching/deforming techniques described hereinabove with respect to FIGS. 3A, 3B, 4, 5 and 6 is that the tire (e.g., 300) must first be cooled down from the molding process sufficiently that the carcass reinforcing member (e.g., 320) is essentially attached at its ends (e.g., 320d and 320e) between the belt (e.g., 312) and the bead (e.g., 302) and can be stretched and deformed between those two ends.

Another nuance of the stretching/deforming techniques described hereinabove with respect to FIGS. 3A, 3B, 4, 5 and 6 is that a tire which has been corrected in such a manner may be required to sit for a period of time ("sit period"), for example twenty four hours, sufficient to take into consideration any viscoelastic relaxation that occurred in the tire after correction, after which time period it may be necessary to re-test the tire for uniformity.

As mentioned above, cords of a carcass reinforcing member (ply) may be made of a variety of materials, including nylon, polyester, steel, Kevlar (tm) and rayon. According to the '781 Patent, the stretching/deforming techniques disclosed therein are not as readily adaptable to correcting tires with steel (metal), Kevlar (tm) and rayon cords.

What is therefore needed is a technique for tire uniformity correction, without grinding, which does not permanently deform the cords of a carcass reinforcing member beyond their elastic limit, which can be utilized on tires having any of a variety of cord materials, which can possibly be performed on a "hot" tire (one which has not completely cooled down from the molding process) and which does not require a "sit period".

BRIEF DESCRIPTION OF THE INVENTION

It is an object of the present invention to provide methods and apparatuses for correcting one or more uniformity characteristics of a pneumatic tire by changing the tension characteristics of the tire under normal inflation.

The present invention relates to a tire construction and method of correcting one or more tire uniformity characteristics. The tire has two beads and a carcass reinforcement ply having reinforcement cords. The method is characterized by the steps of A) forming a portion of the tire with a material that can be rendered plastic and rendered non-plastic, which, in turn, respectively permits and restricts reorientation of the reinforcement cords; B) rendering the material plastic, after the tire has been vulcanized, to permit one or more of the reinforcement cords to be reoriented; C) reorienting one or more reinforcement cords with respect to other reinforcement cords or components; and D) rendering the material nonplastic, to restrict further reorientation of adjacent reinforcement cords. Reorientation of the cords can be achieved without stretching them beyond their elastic limit.

The material can be a thermoplastic, in which case, it is rendered plastic by being heated above its deflection temperature, and rendered nonplastic by cooling below its deflection temperature. It is possible to heat selected portions of the tire to permit reorientation of reinforcement cords, for example in response to measured tire uniformity characteristics. Reorientation of cords can include the cords slipping with respect to the bead. Reorientation of cords can be achieved through applying a force to the tire's sidewall, such as through inflating the tire above its recommended operating pressure and restraining the force at different locations as a function of measured uniformity data. The material's deflection temperature is preferably less than 190 degrees C. and preferably over 121 degrees C. The thermoplastic material can be disposed between the bead and an adjacent portion of the carcass reinforcement ply, such as in the form of a layer extending around the bead. Alternatively, the thermoplastic material can comprise a portion of the tire's apex or a portion of the bead's matrix that encases bead's steel filaments.

Other objects, advantages and features of the invention will become apparent in light of the following descriptions thereof.

BRIEF DESCRIPTION OF THE DRAWINGS

Reference will be made in detail to preferred embodiments of the invention, examples of which may be illustrated in the accompanying drawing figures. The figures are intended to be illustrative, not limiting. Although the invention is generally described in the context of these preferred embodiments, it should be understood that it is not intended to limit the spirit and scope of the invention to these particular embodiments.

Certain elements in selected ones of the drawings may be illustrated not-to-scale, for illustrative clarity. The cross-sectional views, if any, presented herein may be in the form of "slices", or "near-sighted" cross-sectional views, omitting certain background lines which would otherwise be visible in a true cross-sectional view, for illustrative clarity.

Figure 1A:
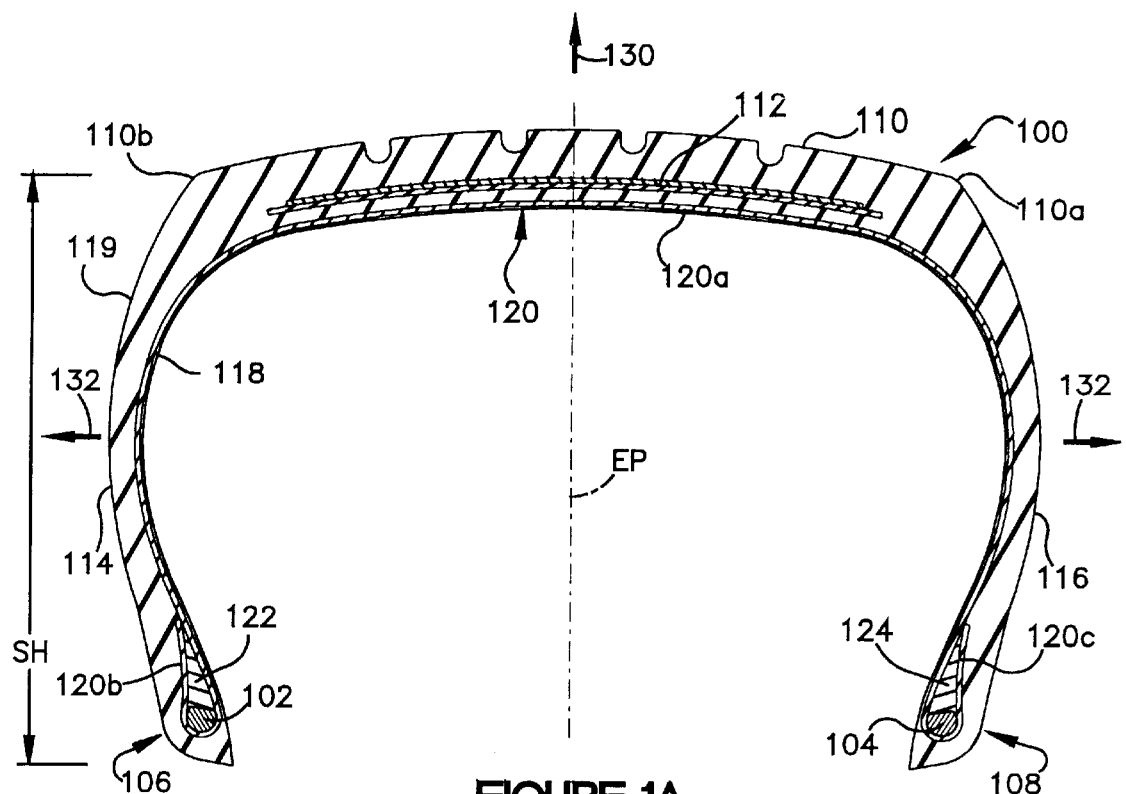

Elements of the figures are typically numbered as follows. The most significant digits (hundreds) of the reference number corresponds to the figure number. Elements of FIG. 1 are typically numbered in the range of 100–199. Elements of FIG. 2 are typically numbered in the range of 200–299. Similar elements throughout the drawings may be referred to by similar reference numerals. For example, the element 199 in a figure may be similar, and possibly identical to the element 299 in another figure. In some cases, similar (including identical) elements may be referred to with similar numbers in a single drawing. For example, each of a plurality of elements 199 may be referred to individually as 199$a$, 199$b$, 199$c$, etc. Such relationships, if any, between similar elements in the same or different figures will become apparent throughout the specification, including, if applicable, in the claims and abstract.

Figure 1B:
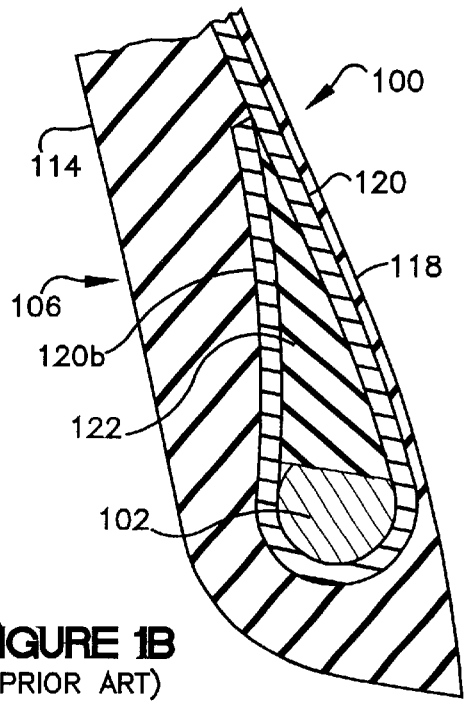
Figure 2A:
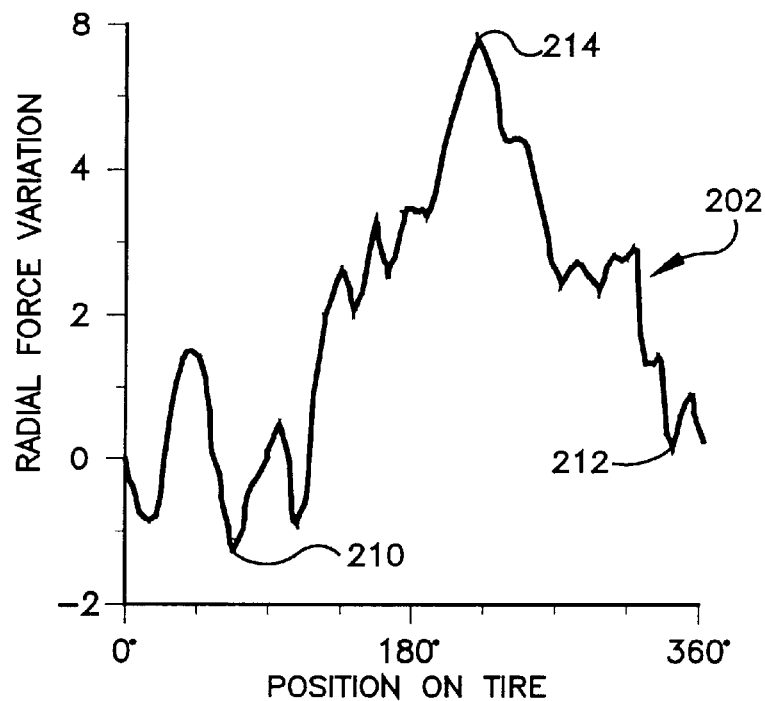
Figure 2B:
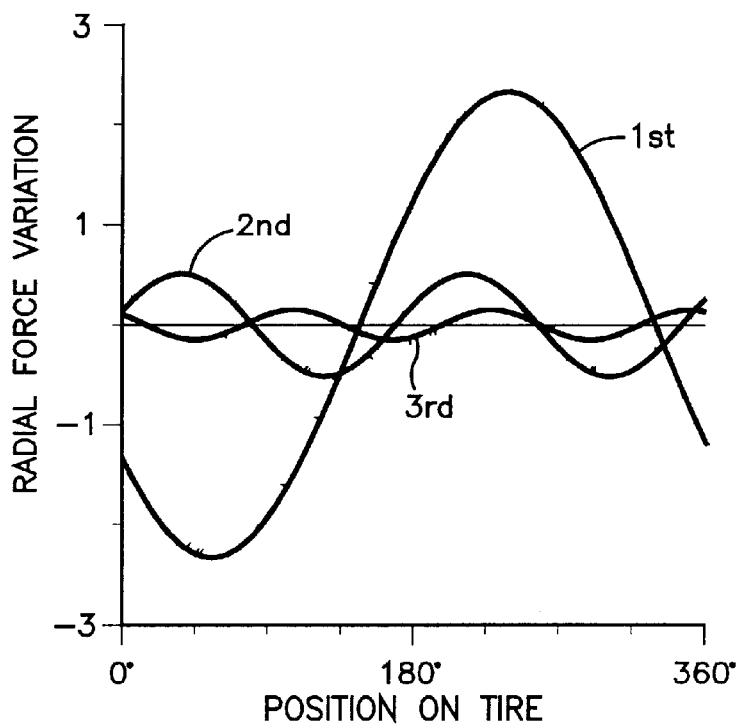
Figure 3A:
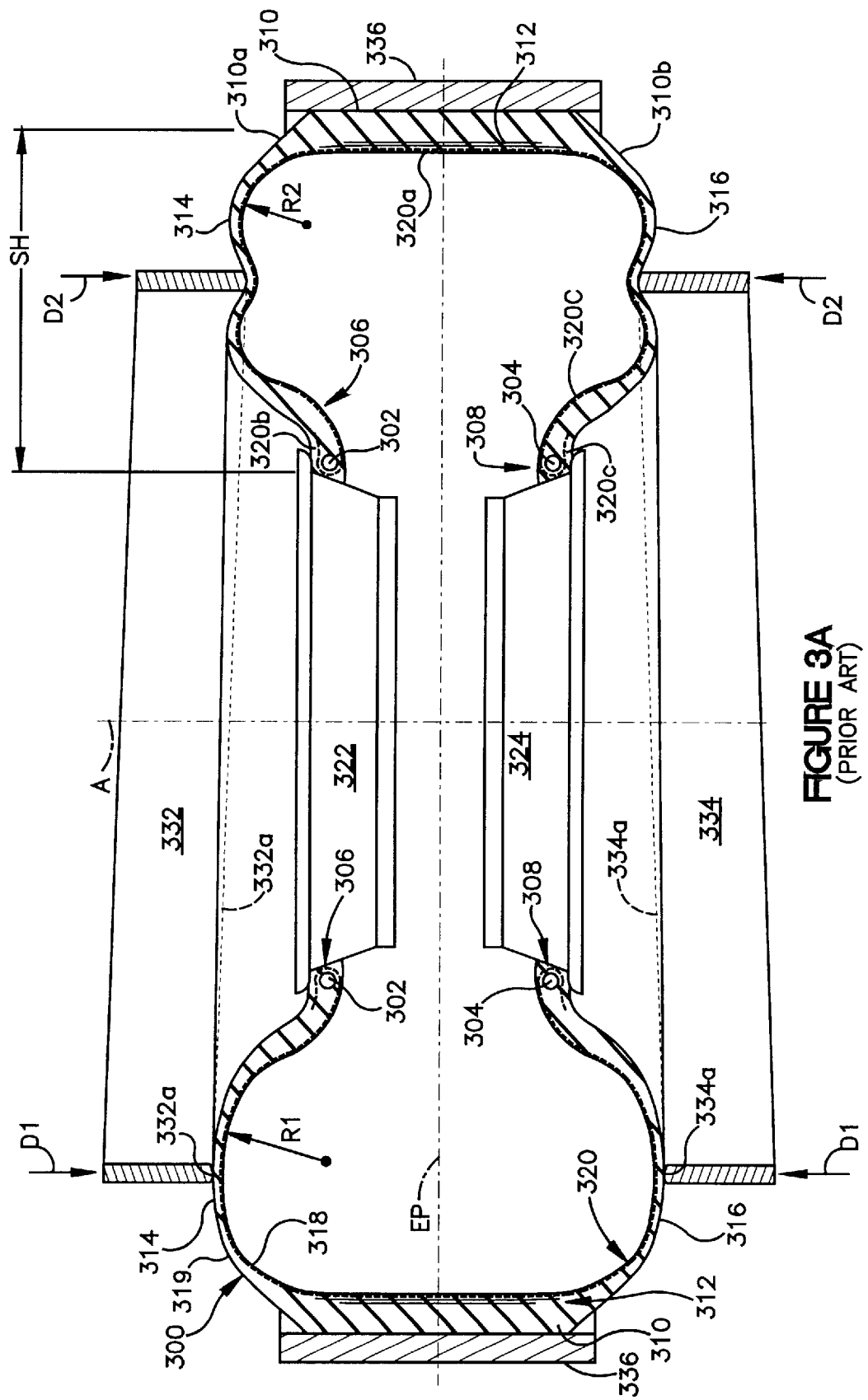
Figure 3B:
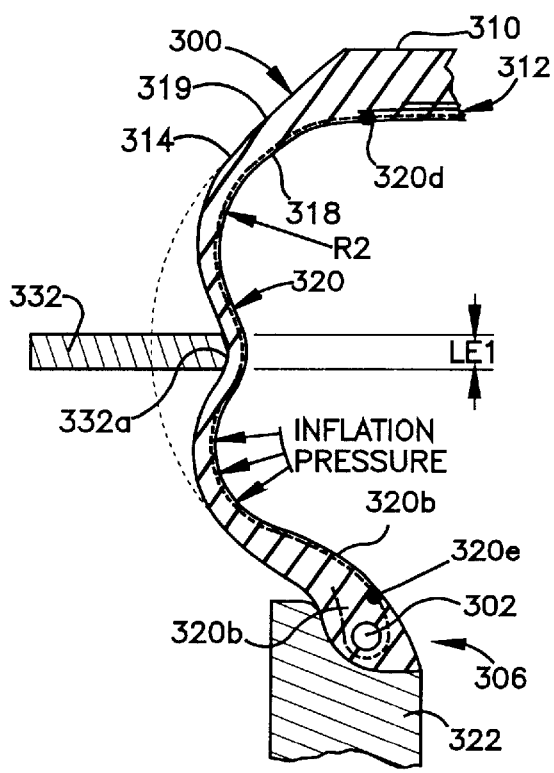
Figure 4:
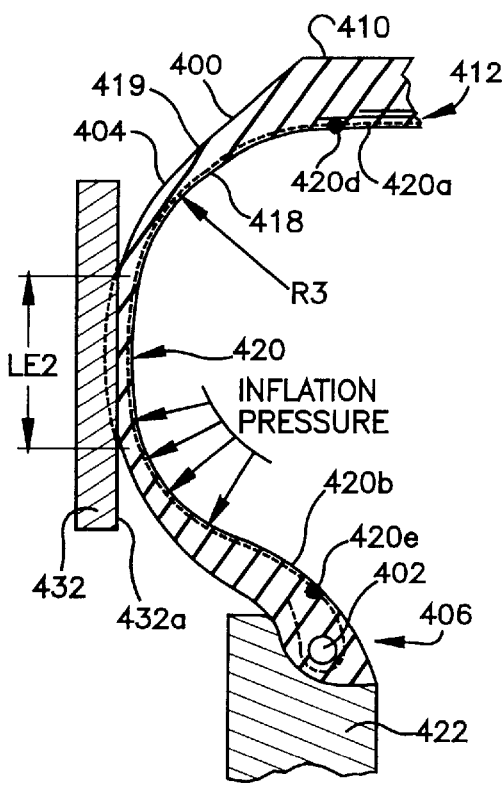
Figure 5:
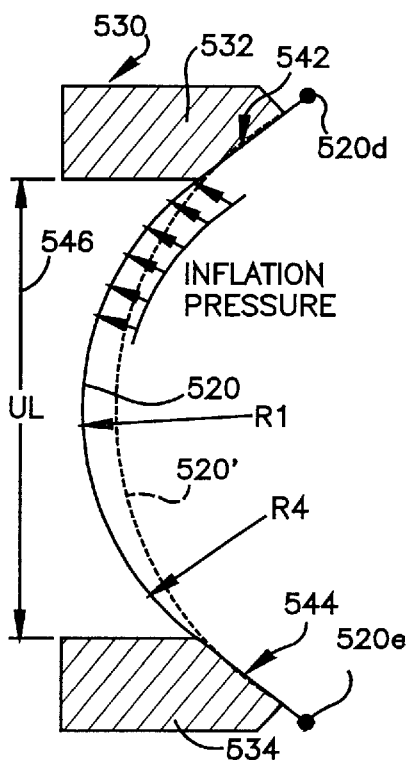
Figure 6:
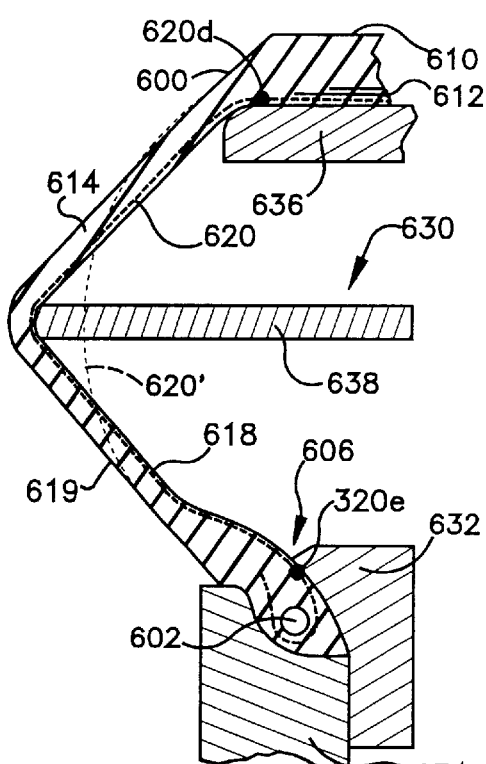
Figure 7A:
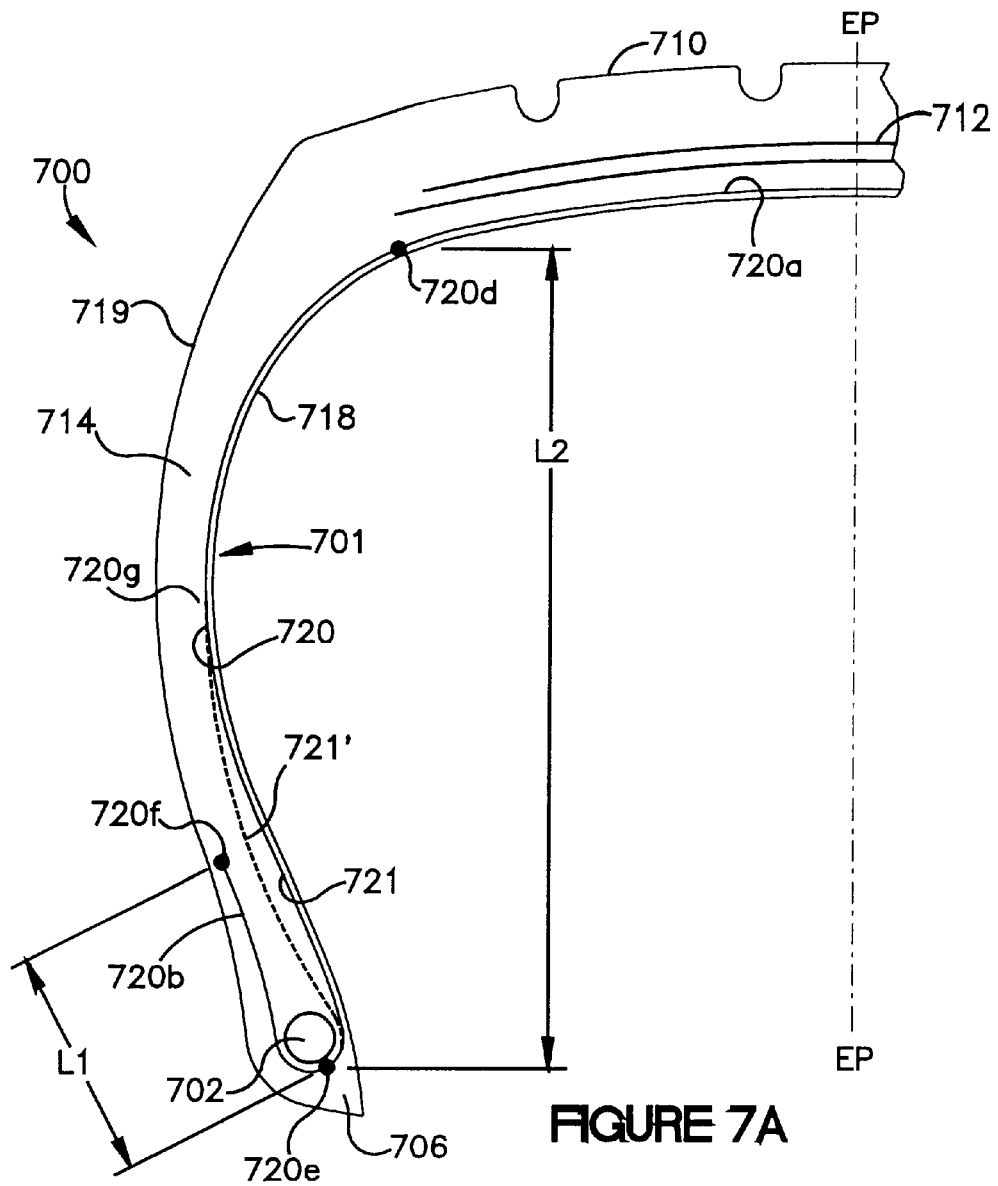
Figure 7B:
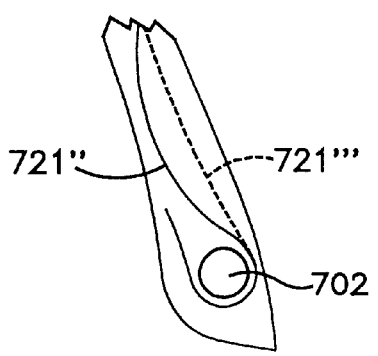
Figure 8:
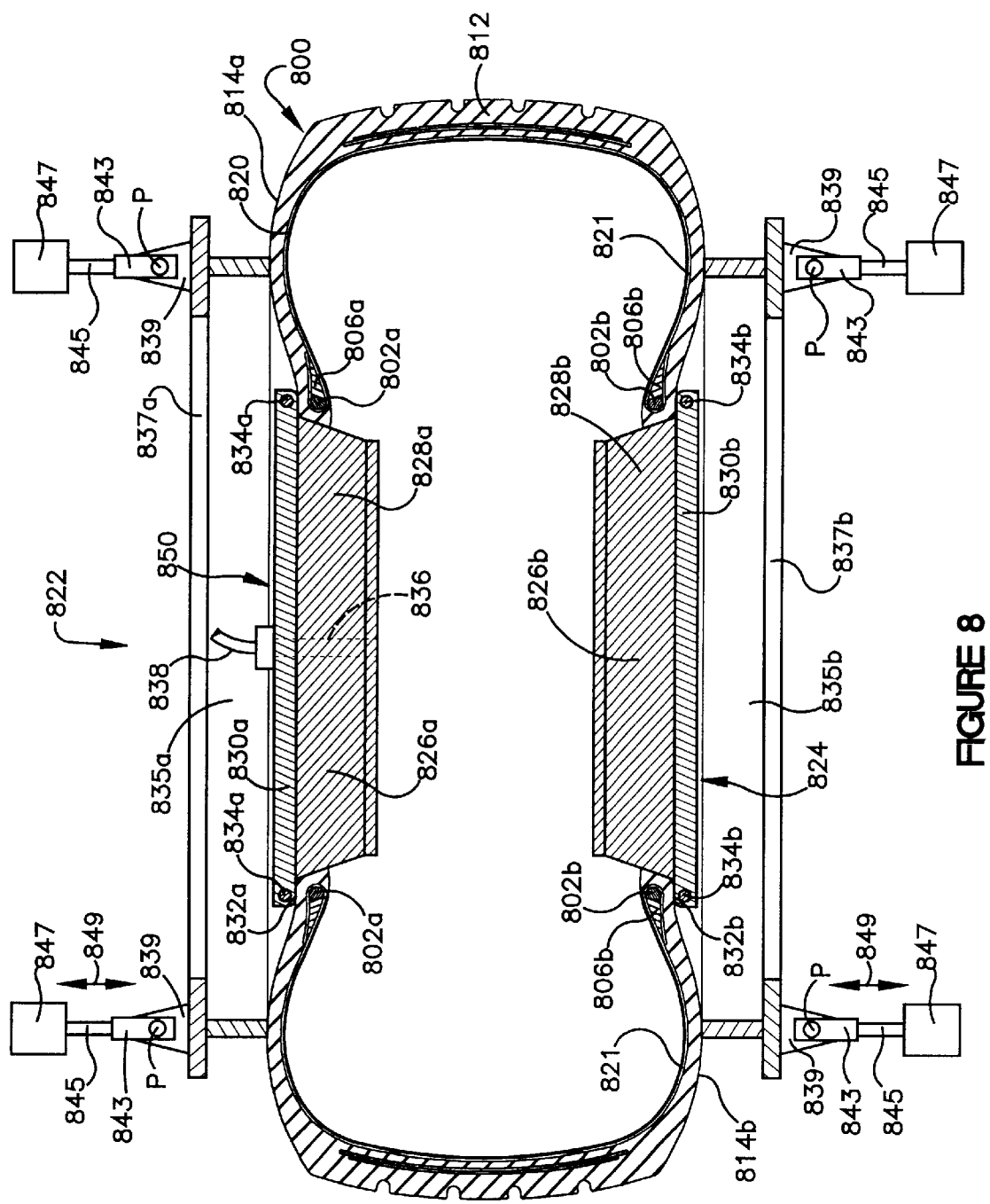
Figure 9:
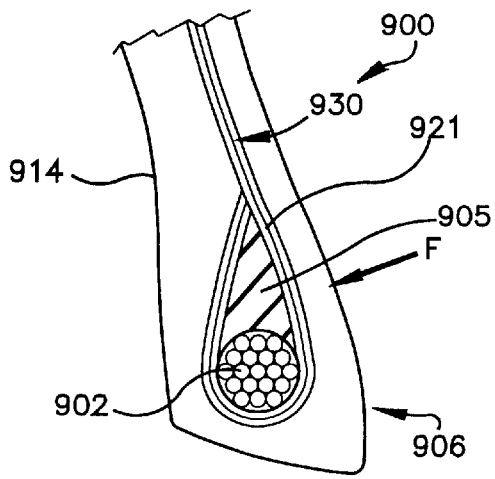
Figure 10:
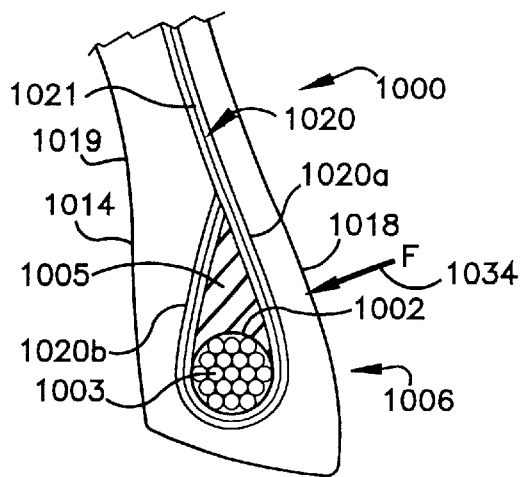
Figure 11A:
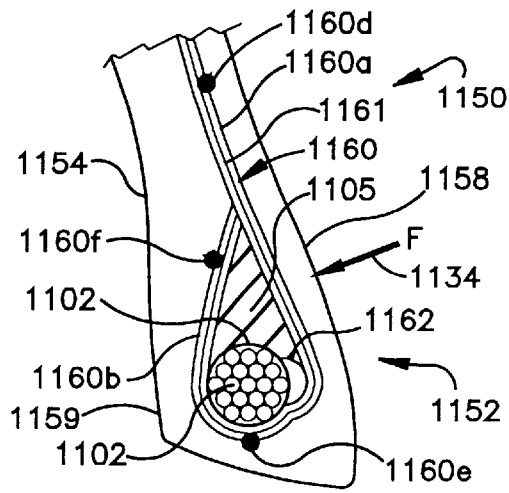
Figure 11B:
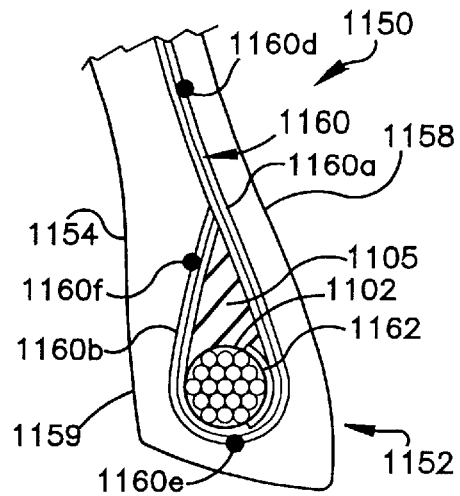
Figure 12:
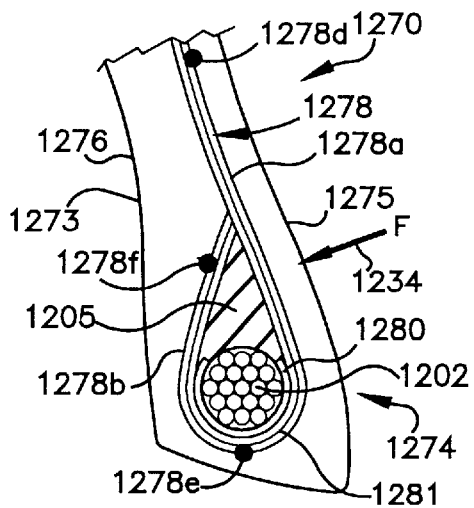
Figure 13:
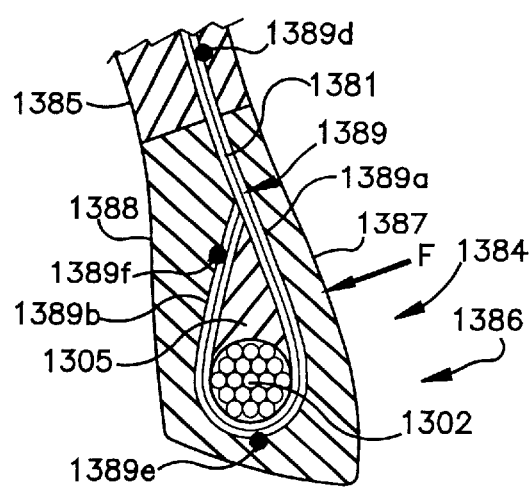

The structure, operation, and advantages of the present preferred embodiment of the invention will become further apparent upon consideration of the following description taken in conjunction with the accompanying drawings, wherein:

FIG. 1A is a cross-sectional view of a pneumatic tire of the prior art;

FIG. 1B is an enlarged view of a portion of the pneumatic tire of FIG. 1A;

FIG. 2A is a graph illustrating a "composite" waveform such as may be generated by a tire uniformity tester, for a tire being tested, according to the prior art;

FIG. 2B is a graph illustrating "harmonic" waveforms of the composite waveform shown in FIG. 2A according to the prior art;

FIG. 3A is a cross-sectional view of a tire being acted upon by a uniformity correction apparatus of the prior art;

FIG. 3B is a cross-sectional view of a portion of the tire of FIG. 3A being acted upon by a uniformity correction apparatus of the prior art;

FIG. 4 is a cross-sectional view of an alternate embodiment of a prior art technique for correcting tire uniformity;

FIG. 5 is a schematic representation of an alternate embodiment of a prior art technique for correcting tire uniformity;

FIG. 6 is a cross-sectional view of an alternate embodiment of a prior art technique for correcting tire uniformity;

FIG. 7A is a cross-sectional view of a section of a tire having a ply cord reoriented to a more curvaceous shape to correct tire uniformity characteristics after being partially cured, according to the invention;

FIG. 7B is a cross-sectional view of a partial section of the tire of FIG. 7A showing a ply cord reoriented to a less curvaceous shape to correct the tire uniformity characteristics after being partially cured;

FIG. 8 is a cross-sectional view of a post cure uniformity apparatus for correcting a uniformity characteristic of a tire, according to the invention;

FIG. 9 is a cross-sectional view of a bead portion of the tire of FIG. 8, according to the invention;

FIG. 10 is a cross-sectional view of a bead portion of a pneumatic tire, before correction, according to an embodiment of the invention;

FIG. 11A is a cross-sectional view of a bead portion of a pneumatic tire, before correction, according to an embodiment of the invention;

FIG. 11B is a cross-sectional view of the bead portion of the pneumatic tire of FIG. 11A, after uniformity correction, according to the invention;

FIG. 12 is a cross-sectional view of a bead portion of a pneumatic tire, according to another embodiment of the invention; and FIG. 13 is a cross-sectional view of a bead portion of a pneumatic tire, according to another embodiment of the invention.

DEFINITIONS

The following terms may be used throughout the descriptions presented herein and should generally be given the following meaning unless contradicted or elaborated upon by other descriptions set forth herein.

"Axial" and "axially" refers to directions that are on or are parallel to the tire's axis of rotation.

"Bead" refers to that part of the tire comprising an annular, substantially inextensible tensile member, typically comprising a cable of steel filaments encased in rubber material.

"Belt structure" or "reinforcement belts" or "belt package" refers to at least two annular layers or plies of parallel cords, woven or unwoven, underlying the tread, unanchored to the bead, and having both left and right cord angles in the range from 18 to 30 degrees relative to the equatorial plane of the tire.

"Circumferential" refers to circular lines or directions extending along the perimeter of the surface of the annular tread perpendicular to the axial direction; it can also refer to the direction of the sets of adjacent circular curves whose radii define the axial curvature of the tread, as viewed in cross section.

"Conicity" refers to a dynamic non-uniformity which may exhibit itself as a tendency of a rotating tire to generate a lateral force regardless of the direction of rotation of the tire, and will manifest itself as a deviation from straight tracking of the tire. Conicity is typically expressed in terms of average lateral force generated during rotation in both directions of the tire.

"Cord" refers to one of the reinforcement strands, including fibers or metal or fabric, with which the plies and belts are reinforced.

"Dimensional non-uniformities" refers to asymmetries that are measurable when the tire is at rest (static).

"Dynamic non-uniformities" refers to asymmetries in rigidity that are manifested essentially only when the tire is centrifugally stressed while rotating.

"Equatorial plane" refers to a the plane perpendicular to the tire's axis of rotation and passing through the center of its tread, or midway between the tire's beads.

"Inflation" refers to the tire cold inflation pressure required for specific loads and speed conditions.

"Inner liner" refers to the layer or layers of elastomer or other material that form the inside surface of a tubeless tire and that contain the inflating gas or fluid within the tire.

"Lateral" refers to directions parallel to the tire's axis of rotation.

"Normal inflation pressure" refers to the specific design inflation pressure at a specified load assigned by the appropriate standards organization for the service condition for the tire.

"Ply" refers to a cord-reinforced carcass reinforcing member (layer) of rubber-coated radially deployed or otherwise parallel cords.

"Pneumatic tire" refers to a laminated mechanical device of generally toroidal shape (usually an open-torus) having two beads, two sidewalls and a tread and made of rubber, chemicals, fabric and steel or other materials.

"Radial" and "radially" refers to directions perpendicular to the tire's axis of rotation.

"Radial force variation" refers to a dynamic non-uniformity, and may be exhibited by a change in the force that a tire under constant normal load (i.e., a load that is perpendicular to the axis of the tire) exerts upon a smooth test surface, such as a roller, when the tire is rotated upon the test surface.

"Radial ply tire" and "radial tire" refers to a belted or circumferentially-restricted pneumatic tire in which at least one ply has cords which extend from bead-to-bead are which are laid at cord angles at about a 90 degree angle to the centerline of the tire.

"Radial runout" refers to a dimensional non-uniformity, wherein the tread radius exhibits lack of symmetry around its circumference (either out-of-round or not concentric around the tire axis).

"Runout" refers to a difference between maximum and minimum indicator readings as applied to:

a. Radial wheel runout—The difference between the maximum and minimum measurements of the wheel bead seat radii measured perpendicular to the spin axis.

b. Lateral wheel runout—The difference between the maximum and minimum measurements parallel to the spin axis on the inside vertical portion of the rim flange.

c. Radial tire runout—The difference between the maximum and minimum measurements on the tread surface and in a plane perpendicular to the spin axis while the tire is mounted on a true wheel.

d. Lateral tire runout—The difference between the maximum and minimum measurements parallel to the spin axis at the widest point of each sidewall of a tire on a true running wheel.

"Section height" (SH) refers to the radial distance from the nominal rim diameter to the outer diameter of the tire at its equatorial plane.

"Sidewall" refers to the portion of a tire between the tread and the bead.

"Tangential" and "tangentially" refer to segments of circular curves that intersect at a point through which can be drawn a single line that is mutually tangential to both circular segments.

"Turn-up end" refers to a portion of a carcass ply that turns upward (i.e., radially outward) from the beads about which the ply is wrapped.

"Uniformity" refers to a measure of a tire's ability to run smoothly and vibration free. Sometimes measured as tire balance or radial and lateral force variation.

"Uniformity characteristic" refers to the deviation of a newly molded tire from the ideal measures of radial runout, radial force variation and conicity.

DETAILED DESCRIPTION OF THE INVENTION

Principle of Correcting Tire Uniformity After Removal From the Tire Mold

In the past, each tire, upon removal from a conventional tire mold, yielded different uniformity characteristics, i.e. deviations from perfect dimensional and dynamic uniformity. The deviations are due to factors such as, the inconsistencies in materials, placement of the materials on the building drum, and other process variables, as discussed hereinbefore.

The present invention is directed to novel manufacturing methods and tire constructions that can allow for corrections of a dimensional non-uniformity, i.e. a non-uniformity that is measurable when the tire is at rest, and/or a dynamic non-uniformity, i.e. a non-uniformity manifested only when the tire is rotating.

In a "perfect" tire, the reinforcement cords in the carcass ply have a substantially uniform tension. Basically, this uniform tension exits in the sections of the reinforcement cords of the carcass ply located in the sidewalls, of the tire and extends substantially between the tire beads and the tire breakers. For example, referring to FIG. 7A, the tire 700 of the present invention has a tire carcass 701, a tread portion 710, and a belt structure 712 between the tread portion 710 and the tire carcass 701. The tire carcass 701 includes a tire carcass reinforcement ply 720, a bead portion 706 having a bead 702, and a tire sidewall 714 generally extending between the tread portion 710 and the bead portion 706. The sidewall 714 has an inner surface 718 and an outer surface 719. The tire 700 outwardly appears like a "standard" off-the-shelf tire, such as a bias, bias/belted and radial tires, but is quite different in that the rubber matrix of the ply coating stock of the carcass reinforcement ply 720 is formed of a special material, discussed in more detail hereinafter, that selectively permits and restricts movement or reorientation of one or more reinforcement members (cords) 721 of the tire carcass reinforcement ply after the tire has been at least partially vulcanized or cured.

The carcass reinforcement ply 720 includes a plurality of tire reinforcing cords 721, which, in the case of a radial tire, are parallel and extend transversely from bead portion 706 to bead portion. The carcass reinforcement ply 720 has a central portion 720a and an end portion ("turn-up" end) 720b which wraps around a respective one of the beads 702 and extends radially (with respect to the tire) back toward the tread portion 710 of the tire 700. The reinforcement cords are selected from the group comprising polyester, Kevlar (TM), steel, rayon, and nylon.

For purposes of this discussion, three "landmarks" (points of interest) are noted on the carcass reinforcing member 720:

a point 720d adjacent the belt structure 712;
  a point 720e at the radially—inwardmost point on the bead 702; and
  a point 720f at the end of the carcass reinforcing member 720.

The central portion 720a of the carcass reinforcing member 720 in the tire sidewall identified as 720g is defined as the portion of the reinforcing member between the point 720d and the radially—inwardmost point 720e on the bead 702. For purposes of the following discussion, the point 720d is considered relatively fixed with respect to the belt structure 712. The point 720e is relatively free to be manipulated to move (e.g., be displaced and/or slip) with respect to the bead 702.

When all of the reinforcing cords 721 in the section 720g have the same shape (curvature) and are of the same length as shown in FIG. 7A, the reinforcement cords in the tire carcass 701 have a substantially uniform tension and the tire 700 is assumed to have perfect uniformity characteristics. However, if the tire 700 is not perfectly uniform, we can assume that either the length or the curvature of the reinforcing cords 721 in the section 720g are not the same. For example, as shown in FIG. 7A, it might be possible to correct certain dimensional or dynamic non-uniformities of tire 700 by permanently reorienting the ply line of certain reinforcing cords 721 from their initial curvature (shown in solid line as 721) to a different ply line (shown in dashed line as 721'. The increased curvaceousness of cords 721' causes an increase in the tension of those cords as compared to the less curvaceous cords 721.

In another example, as shown in FIG. 7B, it might be possible to correct certain dimensional or dynamic non-uniformities of tire 700 by permanently reorienting or reshaping the ply line of certain reinforcing cords 721" from their initial curvature (shown in solid line as 721") to a straighter or less curvaceous ply line (shown in dashed line as 721'''). The decreased curvaceousness of cords 721''' causes a decrease in the tension of those cords relative to the more curvaceous cords 721".

Prior to the present invention, once a tire was at least partially cured in the tire mold, the conventional rubber did not allow for any permanent displacement or reorientation of the reinforcing cords with respect to each other or other tire components or material such as the beads or the sidewalls without permanently stretching the reinforcing cords beyond their elastic limit. Therefore, until the present invention, there was no known tire construction or method to change the length or curvature of the ply reinforcing cords 721 in portion 720g to adjust the cord tensions and thereby correct tire uniformity of an at least partially cured tire. According to the present invention, portions of the tire 700, particularly in the bead area 706, are formed with a material that selectively permits and restricts movement or reorientation of one or more reinforcement members (cords) of the tire carcass reinforcement ply with respect to other tire components after the tire has been at least partially vulcanized or cured. The material can be initially regulated or controlled, after the tire has been at least partially vulcanized (cured), to permit portions of one or more ply reinforcement members or cords to be reoriented and permanently relocated relative to other materials or components of the tire without permanently deforming (stretching) the one or more reinforcement members beyond their respective elastic limits. After the portions of one or more ply reinforcement members or cords are reoriented and permanently relocated, the material is subsequently regulated to restrict further reorientation of the reinforcement members. The relocation or reorientation of the cords, as discussed below, results in a tire having improved uniformity characteristics as compared to tires constructed using the prior art methods and constructions. The relocation or reorientation of the cords, as discussed below, improves one or more uniformity characteristics of the tire under normal inflation pressure.

APPARATUS FOR CORRECTING TIRE UNIFORMITY

FIG. 8 illustrates a relevant portion of a post cure uniformity (PCU) apparatus 822 for mounting a cured tire 800 that is being corrected to improve one or more uniformity characteristics. The PCU apparatus 822 is provided for correcting, without grinding, one or more tire uniformity characteristics, such as, for example, radial force variation and radial runout. Only relevant portions of the apparatus are shown, for illustrative clarity. The PCU apparatus 822 includes a "split rim" 824 comprising two rim mounting halves 826a and 826b. The rim mounting halves 826a and 826b are substantially identical and include a frustroconical tire insert portion 828a, 828b, respectively, and a support base 830a, 830b, respectively, disposed at the outwardly facing side of the insert portion. A cylindrical bead seat 832a, 832b provided near the intersection of the frustroconical insert portions 828a, 828b and the support bases 830a, 830b is adapted to provide a seat and airtight seal in conjunction with the wall of the frustroconical insert portions for the bead portions 806a, 806b of the tire 800. The bead portions include tire beads 802a, 802b respectively.

An important aspect of the apparatus 822 is structure for reheating the tire being corrected. In the preferred embodiment, cylindrical induction coils 834a, 834b are preferably located in the support bases 830a, 830b, respectively, near the cylindrical bead seats 832a, 832b, respectively. The coils 834a, 834b are powered with electric AC current to inductively heat the tire beads 802a, 802b, respectively, when tire 800 is mounted on the PCU apparatus 822. Heat from the beads 802a, 802b conductively heats the material surrounding the beads. Since rubber is a poor heat conductor, the heat is relatively localized around beads 802a, 802b and does not extend up the sidewalls 814a, 814b to the region of the tread portion 812. While the induction coils 834a, 834b are shown in the support bases 830a, 830b below the cylindrical bead seats 832a, 832b, it is also within the terms of the invention to locate the induction coils at any desired location in the rims mounting halves 826a, 826b as long as they are capable of heating beads 802a, 802b as needed. The rim mounting halves 826a and 826b are constructed of a non-electrically conductive material, such as plastic, so as not to interfere with the inductive field generated by the induction coils 834a, 834b. It is understood, that pressurized air can be provided into the cavity of the tire 800 through the split rim 824, such as through an air inlet passage 836 which in turn is connected to a source of pressurized air through an air line 838. The split rim 824 can be mounted to a shaft (not shown) which rotates the two rim mounting halves 826a and 826b with a tire mounted thereon to a desired location.

The PCU apparatus 822 can also include at least one restraint ring 835a and typically additional restraint rings such as restraint ring 835b which are brought into engagement with at least one corresponding sidewall 814a, 814b of tire 800. The number and shape of restraint rings 835a, 835b is determined in accordance with the type of correction desired, as discussed in more detail hereinafter. The restraint rings 835a, 835b are secured to base rings 837a, 837b, respectively, which in turn have support arms 839. Each pivot element 843, respectively, is pivotally secured at a pivot point P that is suitably mounted upon a support shaft 845 operable by an actuator 847, such as an electrical solenoid, a linear motor, a screw actuator, a stepper motor, a hydraulic ram, or the like, which can alter the position of the pivot point P inward or outward, as indicated by the two-headed arrows 849. The actuators 847 can be operated by a programmable controller (not shown) which receives input data from the tire uniformity test machine (not shown). The PCU apparatus 822 can be a stand alone machine or incorporated with the tire uniformity test machine for a combination test and correction operation.

In the operation of a typical tire manufacturing facility, a uniformity measurement operation is usually performed on a cured tire 800 of the present invention, that has already cooled down after having been molded at an elevated temperature. The tire 800 is mounted on a test rim (or "spindle") of a conventional tire uniformity testing machine. Then the tire 800 is inflated and rotated with its tread urged against a rolling surface of a load drum. As the tire 800 rotates, force and/or displacement sensors sense variations in the force of the tire against the load drum and/or variations in a distance between the load drum and the test spindle (i.e., their respective axes of rotation). These sensed variations are converted to signals that are recorded as a function of the angular position of the tire 800, as discussed hereinbefore. The signals corresponding to the tire uniformity characteristics requiring correction are sent in conjunction with the tire 800 on a conveyor belt (not shown) to the PCU apparatus 822 by conventional means such as computer interfaces associated with a programmable controller (not shown) for operating the PCU apparatus.

On the PCU apparatus 822, the tire 800 can be positioned between the two rim mounting halves 826a and 826b, which are initially spaced axially apart from each other. Then by conventional means, such as hydraulic actuators (not shown), the two rim mounting halves 826a and 826b are moved toward each other so that the lower rim mounting half 826b is brought into axial engagement with the lower bead potions 806b and the upper rim mounting half 826a is brought into axial engagement with the upper bead potion 806a to securely mount the tire 800. The tire 800 is then inflated with fluid pressure, such as air, to a pressure sufficient to securely seat the bead potions 806a and 806b against the rim mounting halves 826a and 826b. Next, the beads 802a, 802b are heated by coils 834a, 834b being powered with electric AC current to inductively heat the beads 802a, 802b, respectively. The beads 802a, 802b are heated to a temperature that then conductively heats the material surrounding the beads to the deflection temperature of the special material incorporated , as discussed in more detail below.

Correction of the uniformity characteristic is accomplished by permanently reorienting portions of the one or more reinforcement cords 821 within the carcass reinforcement ply 820 with respect to other components, such as other reinforcement cords or beads, without permanently stretching the one or more reoriented reinforcement cords beyond their respective elastic limits. The reorientation is done preferably by applying relatively high inflation pressure to the interior of the tire for a predetermined time. Input parameters from the programmable controller are preferably used to determine control parameters for the correction operation. The control parameters are known to the programmable controller before the correction operation is initiated. The input parameter of magnitude affects the determination of control parameters such as deflection, time and pressure (or force) which are applied to the tire 800. The input parameter of the location of a soft spot affects the positioning of the tire 800 in the PCU apparatus 822. Other input parameters affecting the control parameter such as deflection, time and pressure applied to the tire 800 include the type and properties of material of the carcass reinforcing member 821. An example of properties include diameter, pitch and number of filaments used in the carcass reinforcing member. Materials of the carcass reinforcing member such as nylon, polyester, steel, Kevlar, and rayon are readily adaptable to correction by the present invention.

ALTERNATIVE EMBODIMENTS OF TIRES HAVING "PLASTIC" PORTIONS

The present invention is directed to a number of new tire constructions and a manufacturing apparatus that can alter the uniformity characteristics of a tire, subsequent to its being cooled down, without grinding or adversely affecting the ply cord' ability to act elastically.

In a first embodiment, as show in FIG. 9, a tire 900 has a bead portion 906 having a bead 902, and carcass reinforcement ply 920 ("reinforcement ply") having reinforcement cords 921 disposed in a matrix of a special ply coating material; i.e. wherein the special ply coating material selectively permits and restricts movement or reorientation of one or more reinforcement cords 921 of the tire reinforcement ply 920 after the tire has been at least partially vulcanized (cured). The special material is one that can be rendered plastic (deformable) and rendered nonplastic (nondeformable), which, in turn, respectively permits and restricts reorientation of the reinforcement cords 921. In addition, an apex 905 adjacent to each bead 902 can be constructed of the special material by itself or blended with some other curable rubber. The special material can be a thermoplastic material, such as a syndiotactic 1,2-polybutadiene SPBD as discussed below, and the curable rubber can be a conventional natural rubber or a high cis-1,2-polybutadiene. The thermoplastic material is plastic (malleable, flowable, deformable) above a "deflection" temperature and is non-plastic below the deflection temperature. For this application, the thermoplastic has a deflection temperature of preferably under 190 degrees C. and preferably above 121 degrees C. An important aspect of a suitable thermoplastic material is that it is preferably co-curable with the surrounding rubber materials. That is, it cross bonds at its interface with the vulcanizable rubber while retaining the ability to exhibit its plastic properties in the non-cocured portion of its volume when it is above the deflection temperature. Also, the special material must be mechanically capable of withstanding the demanding conditions of an automobile or truck tire.

As discussed above, the tire is tested on a tire uniformity testing machine (not shown) using conventional means, and the magnitude of the uniformity characteristics, such as conicity and radial force variation, are compared to acceptable threshold limits. If the tire has a uniformity characteristics magnitudes within a predetermined range that is considered correctable, the tire is forwarded to a Post Cure Uniformity (PCU) apparatus 822, shown in FIG. 8, to correct the uniformity characteristic.

Based on the measured uniformity data from the uniformity testing machine, a programmable controller determines the operating (or "control") parameters for PCU apparatus to correct the uniformity characteristic. For example, a signal is generated by the controller which is indicative of at least the magnitude of correction desired and the angular location from an angular reference location on the tire to be corrected. When the tire 900 is delivered to the PCU apparatus 822, the orientation of the tire may be ascertained relative to a known location on the apparatus.

With the tire 900 properly located positioned and initially inflated, the PCU apparatus 822 is then further activated to assume the position illustrated in FIG. 8 with the restraint rings against the sidewalls. The PCU apparatus 822 includes at least one restraint ring 835a, and typically at least another restraint ring 835b, which is (are) brought into engagement with at least one corresponding sidewall 914 of the tire 900. The number and shape of restraint rings 835a, 835b brought into engagement with the sidewall or sidewalls 914 of the tire 900 is determined as a function of the measured uniformity data. Correcting a typical uniformity characteristic includes inflating the tire 900 to a pressure above the recommended operating pressure of the tire while restraining a portion of the sidewall 914 as a function of the measured uniformity data to control the distribution of the correction around the tire 900. Reorienting, (reshaping, repositioning, displacing, relocating) a portion of the reinforcement ply 920 without permanently stretching any reinforcement cord 921 beyond its elastic limits at different locations around the tire 900 can correct the uniformity characteristic of the tire. Permanent reshaping or reorientation reshaping or lengthening the reinforcement cord 921 is achieved by applying a force, such as with the air pressure in the tire 900. The distribution of the reorientation or reshaping is controlled by restraining one or both of the sidewalls 914 of the tire 900 by an amount that varies around the circumference of the tire. This varying amount is a function of the uniformity characteristic being corrected and other parameters. Restraint rings 835a, 835b can engage the sidewalls with different axial displacements to impart a different radius of curvature to the portion (not shown) of the carcass reinforcement cords 921 in each of the sidewalls 914, as shown in FIG. 3A and discussed in more detail hereinbefore. The restraint rings 835a, 835b are used preferably in conjunction with inflation pressure for correction. The degree that one or both rings 835a, 835b are pressed into the sidewalls 914 of the tire being corrected provides different levels of tension in different carcass reinforcing cords 921.

A force F may be applied to the sidewall 914 of the tire 900, at a position which is radially (with respect to the tire) slightly outward of the bead 902 to cause the carcass reinforcement ply 920 to press against the apexes 905 (which can be in the plastic states) causing the apex to yield (bend) or flatten (thin out) in response to the applied force F so that certain of the ply cords reorient themselves with respect to each other and the bead 902. The force F is also sufficient to cause the portion of the carcass reinforcement ply 920 adjacent the interior side of the bead 902 to move by displacing outward, since the thermoplastic material of the carcass ply 920 is deformable at or above its deflection temperature. In other words, the thermoplastic material of the carcass material will also yield or flatten in response to the applied force F so that the reinforcement cords move closer to the bead. The temperature of at least the bead 902, the apex 905 and the carcass ply stock material (if it is also the special material) in the bead portion 906 of the tire 900 should be at or above the deflection temperature of the thermoplastic material. This is accomplished by applying the force F to the tire 900 after the tire bead 902 is heated with any desired means such as induction heating, as described hereinbefore. A resulting reorientation of the displaced carcass reinforcement ply 920 and/or the resulting yielded or flattened thermoplastic material of the apex 905 allows the reinforcement cords 921 to reorient themselves to either a more curvaceous or straighter location.

The reorientation or reshaping of the carcass reinforcing cords 921 will tend to be the dominant reaction of the reinforcement ply 920 in response to the applied force F and will substantially supplant stretching and permanent elongation of the reinforcement cords such as was described hereinabove with respect to FIGS. 3, 3A, 4, 5 and 6.

In addition to the embodiment where only the reinforcement cords 921 are disposed in a matrix (or ply coating) of special material, as shown in FIG. 9, there are illustrated and described, hereinbelow, a number of non-standard tire constructions, and methods for correcting their uniformity characteristic which include special material in other locations, such as in the bead area, alone or in combination with the special material in the ply coating.

FIG. 10 illustrates a bead portion 1006 of a pneumatic tire 1000 according to another embodiment of the present invention. The tire 1000 has a sidewall 1014, an inner surface 1018, and an outer surface 1019. A bead 1002 and an apex 1005 are disposed in the bead portion 1006. The bead 1002 is typically an annular substantially inextensible tensile member, comprising a plurality (nineteen shown) of steel filaments encased (or embedded) possibly in a matrix 1003 of the special rubber material, such as a thermoplastic. The matrix 1003 can project outward from the wires so that the circumference of the bead 1002 is the material of the matrix. A portion of a carcass reinforcement ply 1020 extends from the tread portion to the bead portion 1006. The reinforcement ply 1020 is elongate, and wraps partially around the bead 1002 and the apex 1005, as described hereinabove. The reinforcement ply 1020 has a plurality of cords 1021 held together by the ply coating special material. The apex 1005 and the ply coating stock can be the special material, as discussed with respect to the embodiment shown in FIG. 9. Alternatively, the apex and ply coating stock can be of a standard, curable rubber material. The reinforcement ply 1020 has a first portion 1020a (referred to as a "central" portion hereinabove) which is disposed on a one side of the bead 1002 toward the inner surface 1018 of the tire 1000 with respect to the bead 1002, and has an second portion ("turn-up" end) 1020b which is disposed on an opposite side of the bead 1002 toward an outer surface (left, as viewed) of the tire 1000 with respect to the bead 1002. The reinforcement ply 1020 is shown wrapping around the bead 1002 from an interior (right, as viewed) side of the bead 1002 to an exterior (left, as viewed) side of the bead 1002 so as to engage the apex 1005, which is typical of most tires.

In a manner such as was discussed hereinabove, the tire is tested on a tire uniformity testing machine (not shown) using conventional means and the magnitude of the uniformity characteristics, such as conicity and radial force variation, are compared to acceptable threshold limits. If the tire has uniformity characteristics magnitudes within a predetermined range that are considered correctable, the tire is forwarded to a Post Cure Uniformity apparatus 822, as shown in FIG. 8 for correction of the uniformity characteristic.

Once the tire is mounted on the Post Cure Uniformity apparatus 822, a programmable controller (not shown) operably connected to the a tire uniformity testing machine and the Post Cure Uniformity apparatus sets a variety of operating parameters according to the correction to be performed. For example, a signal is generated by the controller which is a function of the magnitude of correction desired and the angular location from a reference on the tire to be corrected.

With the tire 1000 properly positioned and inflated, the PCU apparatus 822 is then further activated to assume the position illustrated in FIG. 8 with the restraint rings against the sidewall of the tire. The PCU apparatus 822 includes at least one restraint ring 835a, and typically at least another restraint ring 835b, which is (are) brought into engagement with at least one corresponding sidewall 1014 of the tire 1000. The number and type of restraint rings 935a, 935b brought into engagement with the sidewall or sidewalls of the tire 1000 is determined as a function of the type correction desired. Correcting a uniformity characteristic includes inflating the tire 1000 to a pressure above the recommended operating pressure of the tire while restraining a portions of the sidewall as a function of uniformity data to control the distribution of the correction around the tire. Reorienting or reshaping a portion of the reinforcement ply 1020 without permanently stretching any reinforcement cord 1021 beyond its elastic limits at different locations around the tire 1000 can correct the uniformity characteristic of the tire. Permanent reshaping or reorientation or lengthening of a ply 1020 is achieved by applying a force F, such as with the air pressure in the tire 1000. The distribution of the relocation or reorientation is controlled by restraining one or both of the sidewalls of the tire 1000 by an amount that varies around the circumference of the tire. This varying amount is a function of the uniformity characteristic being corrected. Restraint rings 835a, 835b can engage the sidewalls with different axial displacements to impart a different radius of curvature to different portions (not shown) of the reinforcement ply 1020 in each of the sidewalls 1014, as shown in FIG. 3A and discussed in more detail hereinbefore. The restraint rings 835a, 835b are used preferably in conjunction with inflation pressure for correction. The degree that one or both rings 835a, 835b are pressed into the sidewalls 1014 of the tire 1000 being corrected provides different levels of tension in different reinforcement cords 1021.

The force F may be applied to the sidewall 1014 of the tire 1000, at a position which is radially (with respect to the tire) slightly outward of the bead 1002 to cause the reinforcement ply 1020 to reorient itself with respect to the bead 1002. The force F is sufficient to cause the portion of the reinforcement ply 1020 adjacent the interior side of the bead 1002 to move by displacing outward, since the thermoplastic material 1003 is deformable above its deflection temperature. Also the reinforcement ply 1020 adjacent the interior side of the apex 1005 can move by displacing outward, since the thermoplastic material of the apex material is also deformable above its deflection temperature. In other words, the thermoplastic material 1003 of the bead and or/that of the apex 1005 will yield or flatten in response to the applied force F. The temperature of at least the bead 1002, the matrix material 1003 of the bead and the apex 1005 and the carcass reinforcing stock material (if the latter two are also the special material) in the bead portion 1006 of the tire 1000 should be at or above the deflection temperature of the thermoplastic material. This is accomplished by applying the force F to the tire 1000 after the tire bead 1002 is heated with any desired means such as induction heating, as described hereinbefore. A resulting reorientation of the displaced reinforcement ply 1020, and the resulting yielded or flattened thermoplastic material 1003 and possibly that of the apex allows the reinforcement cords 1021 to reorient themselves to either a more curvaceous or straighter location.

The reshaping or reorientation of the carcass reinforcement cords 1021 will tend to be the dominant reaction of the reinforcement ply 1020 in response to the applied force F and will substantially supplant stretching and permanent elongation of the reinforcement cords such as was described hereinabove with respect to FIGS. 3, 3A, 4, 5 and 6.

One or more tire uniformity characteristics, such as, for example, radial force variation and radial runout may be corrected, without grinding, by exerting a force F, indicated by the arrow 1034, upon the reinforcement ply 1020, at a position adjacent and radially (with respect to the tire) outward from the bead 1002. The force F is shown as being directed from the inside of the tire 1000 to the outside of the tire, and is suitably applied by a tire uniformity correction apparatus (e.g., 822), such as has been described hereinabove.

After correcting the uniformity characteristic of the tire 1000, the thermoplastic material of the various tire components, such as the bead and the apex, is regulated or allowed to cool down, thereby prohibiting further movement of the reinforcement ply 1020 with respect to the bead 1002.

FIGS. 11A and 11B illustrate a bead portion 1152 of what is termed herein a "nonstandard" construction of a tire 1150, according to the invention. A lower portion of the sidewall 1154 is shown. A remaining upper portion of the sidewall 1154 is not shown, and a tread portion (compare 812) is not shown. A bead 1102 is disposed in the bead portion 1152 of the tire 1150. The tire 1150 has an inner surface 1158, an outer surface 1159, typically has an inner liner (not shown), and may be constructed according to any suitable technique of the prior art, as a "bias", "bias/belted" or "radial" tire.

A carcass reinforcement ply 1160 ("reinforcement ply") having reinforcement cords 1161 extends from the tread portion (not shown), through the sidewall 1154, to the bead portion 1152. The reinforcement ply 1160 is elongate, and wraps partially around the bead 1102 and an apex 1105, as described hereinabove. The reinforcement ply 1160 has a portion 1160a which is disposed toward the inner surface 1158 of the tire 1150 with respect to the bead 1102, and has an end portion ("turn-up" end) 1160b which is disposed toward an axially outer surface (left, as viewed) of the tire 1150 with respect to the bead 1002.

For purposes of the ensuing discussion, there are three "landmarks" (points of interest) on the carcass reinforcement ply 1160. A first point 1160d is located on the reinforcement ply 1160 at a position which is radially (with respect to the tire's axis of rotation) outward of the bead 1002. A second point 1160e is located on the reinforcement ply 1160 at a position which is immediately adjacent a radially (with respect to the tire's axis of rotation) inwardmost point on the bead 1102. A third point 1160f is located at the distal end of the turn-up end portion 1160b of the reinforcement ply 1160.

With particular reference to FIG. 11A, a quantity of thermoplastic material 1162 is disposed between the bead 1102, the apex 1105 (which may also be of the generally same formulation of thermoplastic material) and an adjacent portion of the reinforcement ply 1160. As illustrated in FIG. 11A, the thermoplastic material 1162 may initially be in the form of a "blob" (dollop), as viewed in cross-section, disposed on an inward (toward the inner surface 1158) side of the bead 1102. In the "full" (rather than cross-section tire) tire, the material 1162 would take the form of an annular ring of material extending adjacent the annular bead 1102, disposed toward the opposite bead (not shown) of the tire.

A force F 1134 may be applied to the sidewall 1154 of the tire 1150, at a position which is radially (with respect to the tire) slightly outward of the bead 1102 to cause the reinforcement ply 1160 to reorient itself with respect to the bead 1102. The force F is sufficient to cause the portion of the reinforcement ply 1160 adjacent the interior side of the bead 1102 to squeeze the thermoplastic material 1162 and move outward, since the thermoplastic material 1162 is plastic above its deflection temperature. The thermoplastic material 1162 will flatten in response to the applied force F, as shown in FIG. 11B. The temperature of at least the bead 1102, (and the matrix material of the bead, the apex and the carcass ply reinforcing stock material if either are of the special material) in the bead portion 1152 of the tire 1150 should be at or above the deflection temperature of the thermoplastic material. This is accomplished by applying the force F 1134 to the tire 1150 after the tire bead 1102 is heated with any desired means such as induction heating, as described hereinbefore. The resulting flattened thermoplastic material 1162 allows the reinforcement cords 1161 to become straighter or possibly reorient themselves to a more curvaceous location. Thermoplastic material moves circumferentially around the tire from the location that it is flattened under the force F to an adjacent location that is not being pressed by force F. The thermoplastic material 1162 at the location not under force F then swells and causes the reinforcement cords 1161 over it to become more curved. In summary, the cords 1161 near the force F become straighter, and the adjacent cords become more curved. Note that the blob of material 1162 can press into the apex 1105 and in fact the apex can also be squashed from the application of the force to enhance the amount that the reinforcement cords 1161 can move and reorient themselves to either a more curvaceous or straighter location.

The reshaping or reorientation of the carcass reinforcing cords 1161 will tend to be the dominant reaction of the reinforcement ply 1160 in response to the applied force F and will substantially supplant stretching and permanent elongation of the reinforcement cords such as was described hereinabove with respect to FIGS. 3, 3A, 4, 5 and 6.

After correcting the uniformity characteristic of the tire 1000, the thermoplastic material 1003 is regulated by allowing it to cool down, thereby prohibiting further movement of the reinforcement ply 1060 with respect to the bead 1002.

FIG. 12 illustrates a bead portion 1274 of an alternate embodiment of a "nonstandard" construction of a tire 1270 (compare 800), according to the invention.

In a manner similar to that described for the tire 900, only a lower portion of the sidewall 1273 is shown. A remaining upper portion of the sidewall 1273 is not shown, and a tread portion (compare 812) is not shown. A bead 1202 (compare 802) and an apex 1205 are disposed in the bead portion 1274 of the tire 1270. The tire 1270 has an inner surface 1275, an outer surface 1276, typically has an inner liner (not shown), and may be constructed according to any suitable technique of the prior art, as a "bias", "bias/belted" or "radial" tire. A carcass reinforcement ply 1278 having reinforcement cords 1281 extends from the tread portion (not shown), through the sidewall 1273, to the bead portion 1274. The reinforcement ply 1278 is elongate, wraps partially around the bead 1202 and the apex 1205, has a portion 1278a disposed toward the inner surface 1275 of the tire 1270, and has an end ("turn-up") portion 1278b. Three points of interest are shown on the reinforcement ply 1278: a first point 1278d at a position which is radially outward of the bead 1202; a second point 1278e immediately adjacent a radially inwardmost point on the bead 1202; and a third point 1278f located at the distal end of the turn-up end 1278b.

A quantity of thermoplastic material 1280 ("thermoplastic layer") is disposed at least partially around the bead 1202. The thermoplastic material is rendered plastic by being heated above its deflection temperature and rendered non-plastic by being cooled below its deflection temperature, which, in turn, respectively permits and restricts reorientation of adjacent reinforcement cords 1281. As illustrated, the thermoplastic layer 1280 is in the form of a layer having a thickness which is a fraction of a cross-dimension (e.g., diameter) of the bead 1202, and extends from an outward point (10 O'clock position, as viewed) on the bead 1202, past the bottom half (through the 6 O'clock position, as viewed) of the bead, to an inward point (2 O'clock position, as viewed) of the bead 1202. In other words, the thermoplastic layer 1280 extends approximately ¾ of the way around the external surface of the bead 1202, without covering the top (radial outwardmost portion) of the external surface of the bead 1202. However, it is within the scope of the invention that the thermoplastic layer 1280 can extend all the way around the surface of the bead 1002, thereby "enveloping" the bead in a sheath of thermoplastic, in which case the thermoplastic layer would look like a ring concentric with the bead in the cross-sectional view of FIG. 12. It is preferable that the thermoplastic layer 1280 extend sufficiently around the external surface of the bead 1202 so as to be interposed between the reinforcement ply 1278 and the bead 1202, preferably preventing any direct contact between the two.

In a manner similar to the method of correcting a uniformity characteristic of the tire 1150, described hereinabove, one or more uniformity characteristics of the tire 1270, such as, for example, radial force variation and radial runout may be corrected, without grinding, by exerting a force F, indicated by the arrow 1234 (compare 1034), upon the reinforcement ply 1278, from inside the tire at a position adjacent and radially outward from the bead 1202, utilizing a tire uniformity correction apparatus (e.g., 822). As in the previous example, the force F is applied to the tire with the tire reheated, as described hereinabove, so that the thermoplastic material 1280 will be in a plastic (malleable, flowable, deformable) condition. In this example, when the bead 1202 is hot, the force F will cause the portion of the reinforcement ply 1278 which is wrapped around the bead 1202 to "slip" around the bead or squeeze the thermoplastic layer 1280 so that it moves closer to the bead, since the thermoplastic material 1280 is deformable above its deflection temperature. In other words, when heated above its deflection temperature, the thermoplastic layer 1280 will yield and act like a "lubricant" to facilitate movement or reorientation of the reinforcement ply 1278 with respect to the bead 1202. In other words, the thermoplastic material 1280 will yield in response to the applied force F, as shown in FIG. 12. The temperature of at least the bead 1202, (and the matrix material of the bead and the carcass reinforcing ply stock material if either are of the special material) in the bead portion 1274 of the tire 1270 should be at or above the deflection temperature of the thermoplastic material. This is accomplished by applying the force F 1234 to the tire 1270 after the tire bead 1202 is heated with any desired means such as induction heating, as described hereinbefore. The reinforcement cords 1281 slipping around the bead 1202 or the thermoplastic layer 1280 flattening (as in previous embodiments) can lengthen or loosen selected reinforcement cords to correct a uniformity characteristic. In addition, the material of the apex can also be the thermoplastic as previously discussed. Note that the material 1280 can press into the apex 1205, and the apex can also be thinned by the force F to enhance the amount that the reinforcement cords 1281 can move and reorient themselves to either a more curvaceous or straighter location.

The movement or reorientation of the reinforcement ply 1278 and/or its reinforcement cords 1281 will tend to be the dominant reaction of the reinforcement ply in response to the applied force F and will substantially supplant stretching and permanent elongation of the reinforcement ply such as was described hereinabove with respect to FIGS. 3, 3A, 4, 5 and 6.

Selected portions of the tire 1270, such as the bead portion 1274 may be heated (such as with a heat coils 834a, 834b) to selectively permit movement in the selected portions. Furthermore, selected portions of the bead 1202 can be heated to render plastic only selected reinforcement cords 1281 (those cords that are near the bead's heat area). The force F 1234 for moving the tire component may be applied by a combination of mechanical elements and inflation air (e.g., over-inflation) pressure, as described hereinabove. A suitable technique for selectively heating the thermoplastic material 1280 is inductively heating the bead 1202 with electromagnetic energy, thereby raising the temperature of the thermoplastic material 1280 and that of the apex 1205 if appropriate to at least their deflection temperature, without causing a comparable temperature change in other portions and components of the tire 1270.

After correcting the uniformity characteristic of the tire 1270, the thermoplastic material is allowed to cool down, thereby prohibiting further movement of the carcass reinforcement ply 1278 with respect to the bead 1202.

FIG. 13 illustrates a bead portion 1386 of an alternate embodiment of a "non-standard" construction of a tire 1384, according to the invention.

In a manner similar to the tire 1270, only a lower portion of the sidewall 1385 is shown. A remaining upper portion of the sidewall 1385 and a tread portion (compare 110) are not shown. A bead 1302 and an apex 1305 are disposed in the bead portion 1386 of the tire 1384. The tire 1384 has an inner surface 1387, an outer surface 1388, typically has an inner liner (not shown), and may be constructed according to any suitable technique of the prior art, as a "bias", "bias/belted" or "radial" tire. A carcass reinforcement ply 1389 (compare 1278) having reinforcement cords 1381 extends from the tread portion, through the sidewall 1385, to the bead portion 1386. The reinforcement ply 1389 wraps partially around the bead 1302 and the apex 1305, has a portion 1389a disposed toward the inner surface 1387 of the tire 1384, and has an end ("turn-up") portion 1389b. Three points of interest are shown on the carcass reinforcing member 1389: a first point 1389d at a position which is radially outward of the bead 1302; a second point 1389e immediately adjacent a radially inwardmost point on the bead 1302; and a third point 1389f located at the distal end of the turn-up end 1389b.

Whereas in the previously-described tires 1150 and 1270, a quantity or layer of thermoplastic material 1162, 1280 was disposed adjacent or at least partially around the bead 1102, 1202, in both cases being interposed between at least a portion of the reinforcement ply 1160, 1278 and the bead 1102, 1202, to permit movement or reorientation of the carcass reinforcing cord 1161, 1281 with respect to the bead 1102, 1202, in the tire 1384 at least a portion of the entire bead portion 1386 of the tire is formed of thermoplastic material including, inevitably, at least some small amount, including a molecular layer, of thermoplastic material interposing itself (not shown) between the reinforcement ply 1389 and the bead 1302, preferably preventing any direct contact between the two and acting as a "lubricant" to facilitate movement, reorientation, or slippage (as previously discussed) of the carcass reinforcing cords 1391 with respect to the bead 1302.

In a manner similar to the methods of correcting a uniformity characteristic of the tires 1150 and 1270, described hereinabove, one or more uniformity characteristics of the tire 1384, such as, for example, radial force variation and radial runout may be corrected by exerting a force F, indicated by the arrow 1334, upon the carcass reinforcing member 1389, from inside the tire at a position adjacent and radially outward from the bead 1302, utilizing a tire uniformity correction apparatus (e.g., 822). As in the previous example, the force F is applied to the tire with the bead portion 1386 of the tire being reheated, so that the thermoplastic material will be in a plastic condition. Resulting movement, reorientation or slippage of at least a portion of the carcass reinforcing cords 1391 with respect to the beads 1302 will tend to be the dominant reaction of the carcass reinforcing member 1389 in response to the applied force F. This can result in the plastic thermoplastic material allowing the reinforcement cords 1391 to reorient themselves to become either a more curvaceous or more straight.

After correcting the uniformity characteristic of the tire 1384, the thermoplastic material is allowed to cool down, thereby prohibiting further movement or reorientation of the carcass reinforcing cords 1391.

In all the embodiments of the invention, in order to facilitate manipulating (moving) a carcass reinforcing member with respect to a bead, at least a portion of the tire adjacent the bead, or a portion of the bead itself, is formed with a material whose mechanical properties can be controlled or regulated to selectively permit or restrict displacement and/or slippage) of the carcass reinforcing member with respect to the bead. Thermoplastic is an example of such a material. A thermoplastic material is plastic above its "deflection" temperature, and exhibits non-plastic mechanical properties when its temperature is below the its deflection temperature.

It is within the scope of this invention that additional mechanisms can be provided to control movement of the reinforcement plies 920, 1020, 1160, 1278, 1389. A belt restraint ring (not shown, compare element 336 in FIG. 3A) may optionally be provided in contact with the tread portion 812 to keep the tire from expanding in the radial direction during manipulation.

It is generally preferred that the techniques described hereinabove with regard to manipulating a tire component so that at least a portion of the tire component is reoriented, moved (displaced, slipped) be performed with the tire, or at least a portion thereof, hot after being reheated after cooling down. A technique wherein tire uniformity is controlled either with the tire hot, or reheated may be found in European Patent Application No. EP 0 888 872 A2 (published 07.01.1999) which discloses a method for controlling tire uniformity and post-cure inflation apparatus. A post cure inflation is carried out in a state in which the position of a tire which corresponds to the peak portion of the measured radial runout of the tire whose internal portion is in a high temperature state after vulcanization is restrained or in a state in which the position between bead portions of the tire (compare, e.g., the aforementioned U.S. Pat. No. 3,039,839), which correspond to the peak portion of the measured radial runout of the tire whose internal portion is in a high temperature state after vulcanization is held at a minimum width. As a result, the tire after vulcanization can be formed in an appropriate configuration. (see Abstract). As noted therein, the technique can be carried out immediately after vulcanization, for example, about between 0–10 minutes after vulcanization, and can also be carried out when the tire is again heated thereafter to at least 80 degrees Celsius which is the same as the tire immediately after vulcanization, and more preferably, 120–180 degrees Celsius. (page 5, lines 43–53). The process controls the length of the cord member between the bead portions, thereby controlling the tire configuration after post cure inflation.

In a variation of the present invention, heat might be applied to a localized region of an unvulcanized tire, below its vulcanization temperature, immediately prior to vulcanizing of the tire in a mold, to relieve localized or nonuniform cord stress. For the same reason, the green tire might be heated in the mold for a short period of time before pressure is applied.

The thermoplastic materials for use in this invention can be sulfur vulcanizable (i.e. diene-based) or semi-sulfur vulcanizable (having a limited number of sulfur vulcanizable sites) or not sulfur vulcanizable. Two or more different thermoplastic materials may be mixed together or disposed in or near each other in the same tire region. Also, two or more different thermoplastic materials may be used in different tire regions. The thermoplastic materials are selected to exhibit a deflection temperature of less than 190 degrees C. and preferably between 30 degrees C. and 190 degrees C. and more preferably between 121 degrees and 190 degrees C.

An example of a sulfur vulcanizable thermoplastic for use with this invention is a syndiotactic 1,2-polybutadiene (SPBD) that normally has more than 65% of its monomeric units in a syndiotactic 1,2-configuration, as described in U.S. Pat. No. 5,058,647, which is incorporated in its entirety by reference herein. A related reference is U.S. Pat. No. 4,790,365, incorporated in its entirety by reference herein. Another sulfur vulcanizable thermoplastic for use with this invention is a trans-polyoctenamer. These elastomers can be used alone or as a mixture with other diene-based elastomers and/or resins which are hereinafter described.

Semi-sulfur curable resins might be AB and ABA block copolymers, where A represents blocks of polystyrene, poly (alphamethyl styrene) or poly(t-butylstyrene), and B represents blocks of either polyisoprene or polybutadiene. Such block co-polymers may be, for example, SBS or SIS block copolymers, as described in U.S. Pat. No. 5,756,589, incorporated in its entirety by reference herein. Semi-sulfur curable resins would normally be used in a mixture with sulfur curable diene-based elastomers, such as in a range of 5–95 phr and preferably 10–40 phr of the resin in the elastomer(s).

Non-curable resins for use with this invention might be polymers of alphaolefins such as polyethylene, polypropylene, polybutene and copolymers of alphaolefins with minor amounts of other mono-olefins such as 1-hexene and 1-octene. Other non-curable resins might be hydrocarbon, phenol/acetylene and rosin derived resins. Such resins are described in U.S. Pat. No. 5,901,863, incorporated in its entirety by reference herein. Non-curable resins might be used as a blend in mixtures of conjugated diene based sulfur curable elastomers in the amount of, for example, 5–25 phr.

The invention has been illustrated and described in a manner that should be considered as exemplary rather than restrictive in character, it being understood that only preferred embodiments have been shown and described, and that all changes and modifications that come within the spirit of the invention are desired to be protected. Undoubtedly, many other "variations" on the techniques set forth hereinabove will occur to one having ordinary skill in the art to which the present invention most nearly pertains, and such variations are intended to be within the scope of the invention, as disclosed herein.

What is claimed is:

1. A method of correcting one or more tire uniformity characteristics of a pneumatic tire having a pair of spaced beads and at least one carcass reinforcement ply; the reinforcement ply having reinforcement cords; the method being characterized by the following steps;

a) forming a portion of the tire with a material that is rendered plastic and rendered nonplastic, plastic, which, in turn, respectively permits and restricts reorientation of reinforcement cords;

b) rendering the material plastic, after the tire has been at least partially vulcanized, to permit one or more of the reinforcement cords to be reoriented;

c) reorienting one or more reinforcement cords with respect to other reinforcement cords or components;

d) rendering the material nonplastic, to restrict further reorientation of adjacent reinforcement cords;

e) the step of reorienting the one or more reinforcement cords includes reorienting the one or more reinforcement cords with respect to a component other than the reinforcement cords of the tire; and f) the step of reorienting the one or more reinforcement cords includes the step of slipping the one or more reinforcement cords with respect to the bead.

2. A method of correcting one or more tire uniformity characteristics of a pneumatic tire having a pair of spaced beads and at least one carcass reinforcement ply; the reinforcement ply having reinforcement cords; the method being characterized by the following steps;

a) forming a portion of the tire with a material that is rendered plastic and rendered nonplastic, which, in turn, respectively permits and restricts reorientation of reinforcement cords;

b) rendering the material plastic, after the tire has been at least partially vulcanized, to permit one or more of the reinforcement cords to be reoriented;

c) reorienting one or more reinforcement cords with respect to other reinforcement cords or components; and d) rendering the material nonplastic, to restrict further reorientation of adjacent reinforcement cords, and e) the step of reorienting the one or more reinforcement cords includes the step of:
applying a force to a sidewall of the tire to reorient the one or more reinforcement cords.

3. Method, according to claim 2, wherein the step of applying the force includes applying the force by inflation pressure above a recommended operating pressure.

4. Method according to claim 3, wherein the step of applying the force includes restraining the force at different locations as a function of measured uniformity data.

5. Method, according to claim 1, including the step of selecting the material wherein:
the material has a deflection temperature of less than 190 degrees C.

6. Method, according to claim 1, further including the steps of:
measuring one or more tire uniformity characteristics of the tire; and
permanently reorienting the portions of the one or more reinforcement cords without their being stretched beyond their elastic limits in response to the measured one or more tire uniformity characteristics.

7. Tire comprising a tread portion, a pair of beads disposed within respective bead portions, a sidewall, and a carcass reinforcement ply having reinforcement cords;
the tire characterized in that:
the bead portion has a material that is rendered plastic and rendered non-plastic to respectively permit and restrict reorientation of one or more reinforcement cords relative to other reinforcement cords or components of the tire without stretching the cords beyond their elastic limit after the tire has been at least partially vulcanized, the material is a thermoplastic;
the thermoplastic material has a deflection temperature of between 30 degrees C. and 190 degrees C.; and
the thermoplastic material is disposed between the bead and an adjacent portion of the carcass reinforcement ply.

8. Tire comprising a tread portion, a pair of beads disposed within respective bead portions, a sidewall, and a carcass reinforcement ply having reinforcement cords;
the tire characterized in that:
the bead portion has a material that is rendered plastic and rendered non-plastic to respectively permit and restrict reorientation of one or more reinforcement cords relative to other reinforcement cords or components of the tire without stretching the cords beyond their elastic limit after the tire has been at least partially vulcanized;
the material is a thermoplastic;
the thermoplastic material has a deflection temperature of between 30 degrees C. and 190 degrees C.;
the bead has steel filaments encased in a matrix; and
at least a portion of the matrix is comprised of the thermoplastic material.

9. Tire, according to claim 8, characterized in that:
the thermoplastic material is disposed between each pair of beads and adjacent portions of the respective carcass reinforcement plies.

10. Tire comprising a tread portion a bead portion, a sidewall, and a carcass reinforcement ply having reinforcement cords;
the tire characterized in that:
the bead portion has a material that is rendered plastic and rendered non-plastic to respectively permit and restrict reorientation of one or more reinforcement cords relative to other reinforcement cords or components of the tire without stretching the cords beyond their elastic limit after the tire has been at least partially vulcanized in which;
the material is selected from the group consisting of sulfur vulcanizable materials including syndiotactic 1,2-polybutadiene and trans-polyoctenamer;
semi-sulfur curable resins including AB and ABA block copolymers, where A represents blocks of polystyrene, poly(alphamethyl styrene) or poly(t-butylstyrene), and B represents blocks of either polyisoprene or polybutadiene, and SBS or SIS block copolymers; and
non-curable resins including polymers of alphaolefins such as polyethylene, polypropylene, polybutene and copolymers of alphaolefins with minor amounts of other mono-olefins such as 1-hexene and 1-octene, and hydrocarbon, phenol/acetylene and rosin derived resins; and
the material is incorporated in ply coating stock of the carcass reinforcement ply.

11. Tire, according to claim 10 in which at least a portion of the entire bead portion of the tire is formed of thermoplastic material.

* * * * *